(12) United States Patent
Shiragami et al.

(10) Patent No.: US 7,242,771 B2
(45) Date of Patent: Jul. 10, 2007

(54) CONTENTS MANAGEMENT SYSTEM

(75) Inventors: Naomi Shiragami, Nishinomiya (JP); Kazumi Hatoh, Osaka (JP)

(73) Assignee: Matsushita Electric Industrial Co., Ltd., Osaka (JP)

( * ) Notice: Subject to any disclaimer, the term of this patent is extended or adjusted under 35 U.S.C. 154(b) by 777 days.

(21) Appl. No.: 10/603,486

(22) Filed: Jun. 25, 2003

(65) Prior Publication Data
US 2004/0052378 A1    Mar. 18, 2004

(30) Foreign Application Priority Data
Jun. 26, 2002    (JP)    ............... 2002-186589

(51) Int. Cl.
H04N 7/167 (2006.01)
H04L 9/00 (2006.01)
H04L 9/32 (2006.01)

(52) U.S. Cl. .................. 380/200; 380/201; 380/277; 713/189; 713/193

(58) Field of Classification Search ............ 726/26–30; 380/200, 201, 277; 713/189, 192–193; 705/51, 705/57, 59
See application file for complete search history.

(56) References Cited

U.S. PATENT DOCUMENTS

| | | | | | |
|---|---|---|---|---|---|
| 5,991,399 A | * | 11/1999 | Graunke et al. | ............ | 380/279 |
| 6,865,555 B2 | * | 3/2005 | Novak | ............ | 705/59 |
| 2002/0013897 A1 | * | 1/2002 | McTernan et al. | ............ | 713/153 |
| 2003/0014630 A1 | * | 1/2003 | Spencer et al. | ............ | 713/168 |

FOREIGN PATENT DOCUMENTS

| | | |
|---|---|---|
| JP | 2000-200229 | 7/2000 |
| JP | 2002-41482 | 2/2002 |
| WO | 00/62265 | 10/2000 |

* cited by examiner

*Primary Examiner*—Hosuk Song

(57) ABSTRACT

A contents management system that centrally manages a disclosure period of contents stored on recording media and distributed to users, while at the same time securing the safety of the contents. A contents management server in the system controls the disclosure period of contents by managing information relating to contents and users, with respect to encrypted contents stored on recording media and distributed to users. Moreover, the contents management server is able to make changes to the various items included in the information relating to contents and users, and is able to control the disclosure of contents using this information immediately after a change.

15 Claims, 22 Drawing Sheets

FIG.5

| CONTENT ID | RELEASE PERIOD (START) | RELEASE PERIOD (END) | FIELD CODE | RELEASE CLASS. | REGISTRATION USER | REGISTRATION DATE | UPDATE USER | UPDATE DATE | PROVIDER ID |
|---|---|---|---|---|---|---|---|---|---|
| A-2002001 | 2001 10 01 | 2002 03 31 | A | 0 | 3980000 | 2001 09 10 | — | — | 3390709 |
| A-2002002 | 2001 10 01 | 2002 03 31 | A | 1 | 3980000 | 2001 09 10 | — | — | 4031219 |
| B-2002001 | 2001 10 01 | 2002 03 31 | B | 1 | 3980000 | 2001 09 10 | 3980000 | 2001 10 02 | 4050917 |
| ... | ... | ... | ... | ... | ... | ... | ... | ... | ... |

130 CONTENT TABLE

| CONTENT ID | DECRYPTION KEY | REGISTRATION USER | REGISTRATION DATE | UPDATE USER | UPDATE DATE |
|---|---|---|---|---|---|
| A-2002001 | Tao51017oFn9 | 3980000 | 2001 09 10 | — | — |
| A-2002002 | hc895D99dev1 | 3980000 | 2001 09 10 | — | — |
| B-2002001 | Mso4260ro87 | 3980000 | 2001 09 10 | — | — |
| .. | | | ... | ... | ... |

140 DECRYPTION KEY TABLE

1400

CONTENTS MANAGEMENT SYSTEM

This application is based on an application no.2002-186589 filed in Japan, the content of which is hereby incorporated by reference.

BACKGROUND OF THE INVENTION

1. Field of the Invention

The present invention relates to technology for managing contents stored on portable recording media and distributed to users.

2. Related Art

One method of delivering contents to users is to distribute contents stored on recording media. Since there is a possibility of contents stored on recording media and delivered to users being played and copied indiscriminately, the improper use of contents needs to be prevented.

As technology that prevents the improper use of contents, unexamined Japanese patent application publication no. 2002-41482 discloses technology in which an encrypted content and a computer program (hereinafter, simply "program") are stored on a recording medium, decryption information for decrypting the encrypted content is managed by a center, and the decryption information is acquired from the center by running the program.

Furthermore, in unexamined Japanese patent application publication no. 2000-200229 is disclosed technology for storing rights information showing an allowable number of content playback and the like on a recording medium together with both an encrypted content generated by encrypting a content and a decryption key for decrypting the encrypted content, and decrypting and playing the content using the decryption key, in compliance with the rights information.

On the other hand, there are those who want to manage the disclosure of contents, such as, for example, being able to set the release period of a content and permit the use of the content in accordance with the release period, after a recording medium that stores the content has been predistributed. However, the above technology is not able to meet demands such as this.

SUMMARY OF THE INVENTION

In view of the above issue, an object of the present invention is to provide a contents management system capable of managing the disclosure of a content, even when the content has been stored on a recording medium and distributed.

To achieve the above object the present invention is a contents management system in which a playback device plays an encrypted content stored on a portable recording medium, using a decryption key acquired from a management device, the contents management system including: the management device, which holds the decryption key for decrypting the encrypted content in correspondence with disclosure information relating to disclosure of the encrypted content, refers to the disclosure information and judges, when a request is received from the playback device, whether disclosure of the encrypted content is permitted, and transmits the decryption key to the playback device if judged that disclosure is permitted; the recording medium, which stores the encrypted content encrypted using an encryption key, and a key request program for requesting the management device for the decryption key; and the playback device, which reads from the recording medium and executes the key request program, receives the decryption key from the management device, reads from the recording medium and decrypts the encrypted content using the decryption key, and plays the decrypted content.

According to this structure, since disclosure information relating to disclosure of an encrypted content is held in a management device, the management device is able to centrally manage the disclosure information, even after a portable recording medium has been distributed to a user. Furthermore, by storing a key request program, used for requesting the management device for a decryption key, on the recording medium, it is possible for a content to be managed safely in the same way as when disclosure information is stored on the recording medium.

Here, the management device may store, as disclosure information, period information showing at least one of a disclosure start date and a disclosure end date, and may judge whether disclosure of the content is permitted according to the period information.

According to this structure, since period information, which is the disclosure period of an encrypted content, is held by the management device, the management device is able to centrally manage the disclosure period, even after a portable recording medium has been distributed to a user.

Also, by having the management device hold a disclosure start date, it is possible, for example, to playback package media relating to a movie after the movie has been released, and by having the management device hold a disclosure end date, it is possible to suppress the indiscriminate distribution of a decryption key, and as a result to prevent a content from being improperly used.

Here, the playback device may include a key request program executing unit operable to read from the recording medium and execute the key request program; a key receiving unit operable to receive the decryption key from the management device; a content reading unit operable to read the encrypted content from the recording medium; and a playback unit operable to decrypt the encrypted content using the decryption key and playback the decrypted content. Furthermore, the management device may include a key storage unit storing the decryption key; a disclosure information storage unit storing the period information as disclosure information; a disclosure judging unit operable to receive the request from the playback device, and to refer to the period information and judge whether disclosure of the encrypted content is permitted; and a key transmitting unit operable, if judged that disclosure is permitted, to transmit the decryption key to the playback device.

According to this structure, since the playback device requests the management device for a decryption key used for decrypting an encrypted content by reading and executing the key request program stored on the recording medium, it is possible for the content to be safely managed because only a bona fide playback device that has received distribution of the recording medium can acquire the decryption key and decrypt the content.

Also, the present invention is a portable recording medium storing an encrypted content to be played by a playback device using a decryption key acquired from a management device, the management device holding the decryption key of the encrypted content, and the recording medium storing the encrypted content encrypted using an encryption key, and a key request program for requesting the management device for the decryption key.

According to this structure, since the recording medium stores an encrypted content and a key request program for requesting a decryption key for decrypting the encrypted content from a management device, the content cannot be played by simply mounting the recording medium in the playback device, and it is thus possible to safely manage the content.

Also, the present invention is a management device that holds a decryption key for decrypting an encrypted content stored on a portable recording medium and transmits the decryption key to a playback device, the recording medium storing the encrypted content encrypted using an encryption key and a key request program for requesting the management device for the decryption key, and the management device including: a key storage unit storing the decryption key; a disclosure information storage unit storing disclosure information relating to disclosure of the encrypted content; a disclosure judging unit operable to receive a request from the playback device, and to refer to the disclosure information and judge whether disclosure of the encrypted content is permitted; and a key transmitting unit operable, if judged that disclosure is permitted, to transmit the decryption key to the playback-device. Furthermore, the disclosure information storage unit may store, as disclosure information, period information showing at least one of a disclosure start date and a disclosure end date.

According to these structures, it is possible to centrally manage the propriety of disclosing an encrypted content using the management device, because the management device stores a decryption key for decrypting the encrypted content stored on the recording medium and period information showing a disclosure period of the encrypted content.

Here, the disclosure information storage unit may store period information that includes a user identifier uniquely identifying a user using the playback device, and relates to disclosure of the encrypted content to the user identified by the user identifier, and the disclosure judging unit, on receipt from the playback device of a request that includes the user identifier, may judge using the period information whether disclosure of the encrypted content is permitted to the user identified by the user identifier.

According to this structure, it is possible for the management device to judge, for every user, whether disclosure of an encrypted content is permitted.

Here, the recording medium may store a plurality of encrypted contents in correspondence with content identifiers uniquely identifying individual encrypted contents, each of which has been encrypted using a different encryption key, the disclosure information storage unit may store a piece of the period information for each of the encrypted contents, and the disclosure judging unit, on receipt from the playback device of the request that includes the user identifier and a content identifier, may judge using the period information whether disclosure of an encrypted content identified by the content identifier is permitted to the user identified by the user identifier.

According to this structure, it is possible for the management device to judge, for every user, whether disclosure is permitted in relation to each of a plurality of encrypted contents.

Here, the disclosure information storage unit may further store content information and user information, the content information including, for each encrypted content, at least one of a secrecy classification showing a secrecy of the encrypted content and a field showing a substance of the encrypted content, and the user information including at least one of a useable classification, a useable count number and a useable field of the user, and the disclosure judging unit may judge whether disclosure of the encrypted content is permitted to the user, by referring to the period information, the content information, and the user information.

According to this structure, it is possible for the management device to judge whether disclosure is permitted according to not only a disclosure period but also a secrecy classification and/or a field of a content, and furthermore, to also judge, for each user, whether disclosure is permitted according to a usable count number.

Here, the management device may further include an update reception unit operable to receive update information for use in updating the period information; and an update unit operable to update the period information according to the received update information.

According to this structure, even if a content is stored on a recording medium that has been distributed to a user, it is possible for the management device to control the disclosure of the content according to a condition immediately after altering the period information, without having to recall the recording medium, change the rights information and so forth.

Here, the management device may further include an historical information generation unit operable, on receipt of a request from the playback device, to generate historical information that includes a user identifier which uniquely identifies a user using the playback device, and a content identifier which uniquely identifies the encrypted content; and an historical information storage unit that stores the generated historical information.

According to this structure, a management device can manage the history of user requests for decryption keys.

Also, the present invention is a playback device that plays an encrypted content stored on a portable recording medium, using a decryption key acquired from a management device, the recording medium storing the encrypted content encrypted using an encryption key, and a key request program for requesting the management device for the decryption key, and the playback device reading from the recording medium and executing the key request program, and on receipt of the decryption key from the management device, reading from the recording medium and decrypting the encrypted content, and playing the decrypted content.

According to this structure, since the playback device requests the management device for a decryption key by executing a key request program stored on the recording medium, it is only possible for a bona fide user that uses the playback device to request the decryption key.

Furthermore, the contents management system may further include a manager device used by a manager of the system, the manager device receiving update information used for updating the period information and transmitting the received update information to the management device, and the management device receiving the update information from the manager device and updating the period information according to the received update information.

According to this structure, because the management device updates period information in response to a request from a manager device, the manager of the system is able to conduct detailed management of the disclosure period of a content by transmitting an instruction to the management device to update the period information according to conditions. Furthermore, it is possible to conduct contents management using information immediately after a change has been made.

Furthermore, the contents management system may further include a manager device used by a manager of the system, the management device, on receipt of a request from the playback device, generating historical information that includes a user identifier which uniquely identifies a user using the playback device, and a content identifier which uniquely identifies the encrypted content, and storing the generated historical information, the manager device receiving an historical information request for transmission of historical information stored by the management device, and transmitting the received historical information request to the management device, and the management device receiving the historical information request from the manager device, reading the stored historical information and transmitting the read historical information to the manager device.

According to this structure, because a management device manages the history of user requests for decryption keys, and the manager of the system acquires the history from the management device, it is possible for the manager to find out who used which contents.

BRIEF DESCRIPTION OF THE DRAWINGS

These and other objects, advantages and features of the invention will become apparent from the following description thereof taken in conjunction with the accompanying drawings that illustrate specific embodiments of the present invention.

In the drawings:

FIG. 5 shows a data structure of a content table 130;

FIG. 6 shows a data structure of a decryption key table 140;

DETAILED DESCRIPTION OF THE PREFERRED EMBODIMENTS

The following description relates to a contents management system 1 as an embodiment of the present invention, with reference to the drawings. "Contents" refers to technical material converted to PDF (portable document format) file format. Here, a single file is referred to as a single "content". Contents management system 1 is a system for managing the disclosure of contents in an enterprise.

Structure

The following description relates to a structure of contents management system 1.

Figure 1:
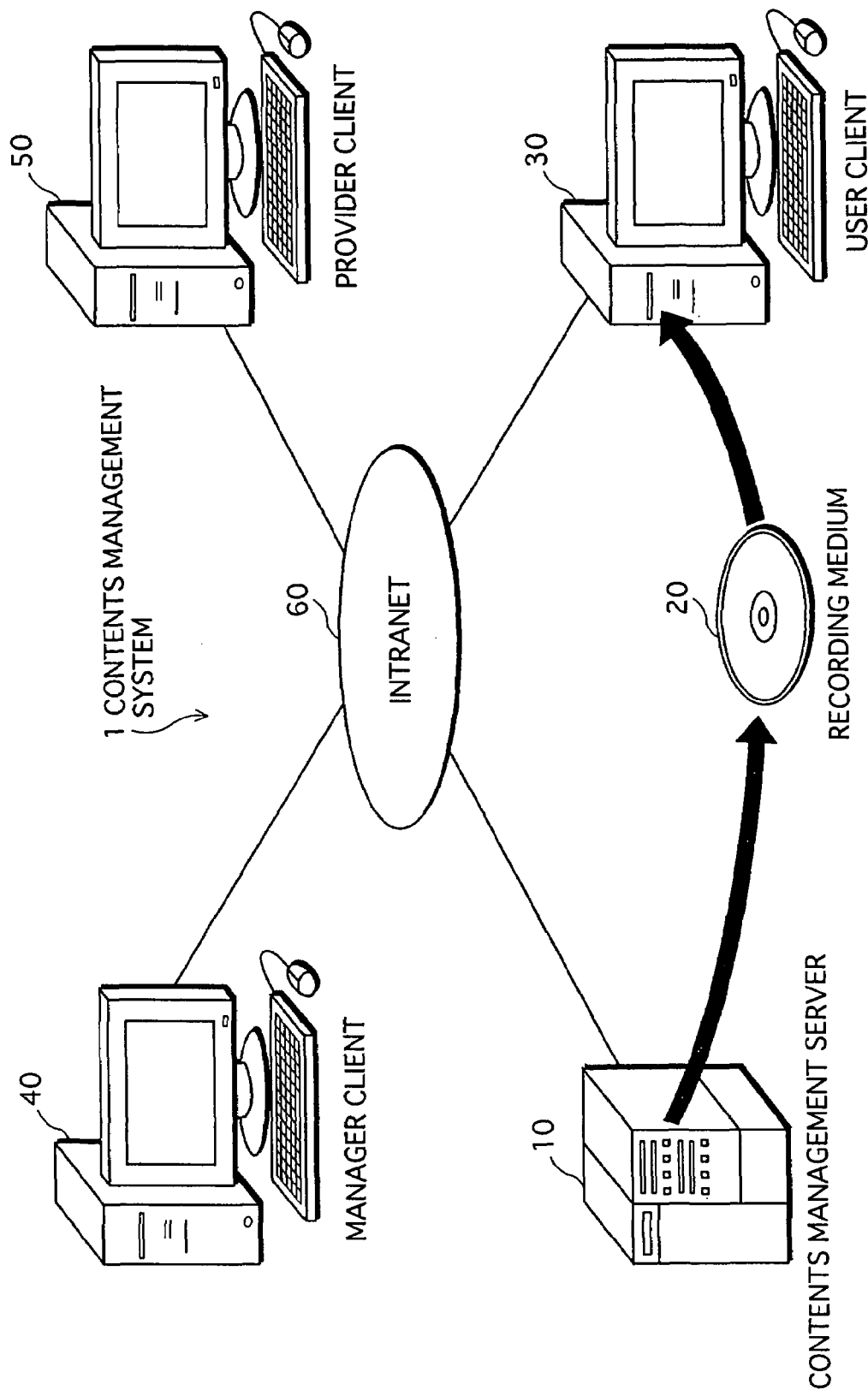
FIG. 1 shows a structure of a contents management system 1.

FIG. 1 shows the structure of contents management system 1. As shown in FIG. 1, contents management system 1 is structured from a contents management server 10, a user client 30, a provider client 50 and a manager client 40 which are connected via an intranet 60. Furthermore, a portable recording medium 20 having one or more contents stored therein by contents management server 10 is distributed in advance from a manager to a user.

Contents management server 10 is used by the manager of the system and stores information required in managing contents in a database. User client 30 is used by a user of the system. Manager client 40 is used by the manager of the system. Provider client 50 is used by a provider of contents in the system.

1. Contents Management Server 10

Contents management server 10 encrypts contents to generate encrypted contents, and stored the encrypted contents on recording medium 20. Server 10 also stores, in a database, information required to manage encrypted contents stored on recording medium 20 distributed to a user.

Figure 2:
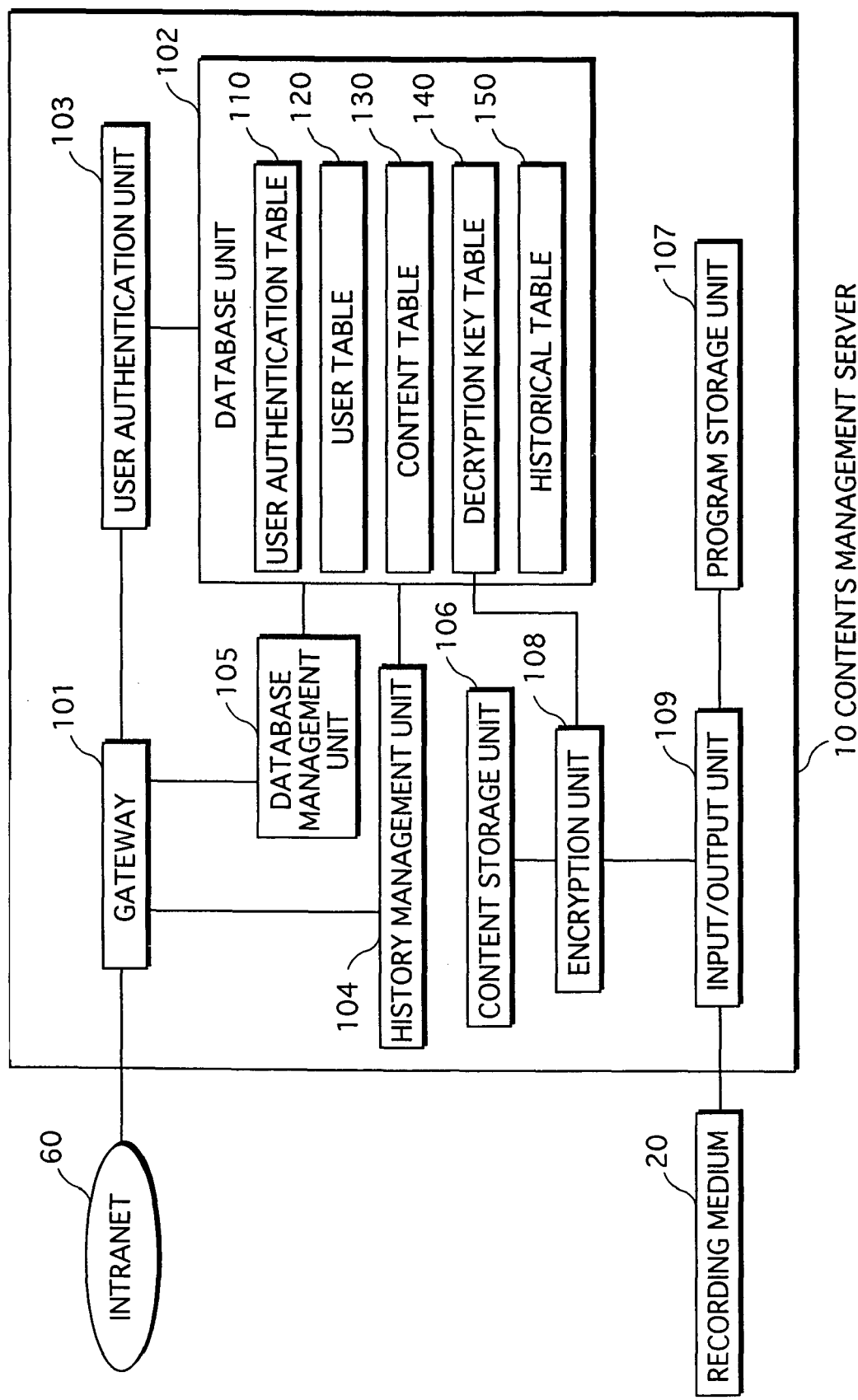
FIG. 2 is a block diagram showing a structure of a contents management server 10.

FIG. 2 is a block diagram showing a structure of contents management server 10. As shown in FIG. 2, server 10 is structured from a gateway 101, a database unit 102, a user authentication unit 103, a history management unit 104, a database management unit 105, a content storage unit 106, a program storage unit 107, an encryption unit 108, and an input/output unit 109.

Contents management server 10 is specifically a computer system structured from a microprocessor, a ROM, a RAM, a hard disk unit, a display unit, a keyboard, a mouse and so forth. On the RAM or the hard disk unit is stored a program. Server 10 carries out functions as a result of the microprocessor operating in accordance with the program.

(1) Gateway 101

Gateway 101 conducts transmission/reception of information between user authentication unit 103 and user client 30 via intranet 60. Gateway 101, on receipt of a decryption key from user authentication unit 103, performs a base 64 conversion on the received decryption key and transmits the converted decryption key to user client 30 via intranet 60. Gateway 101 also conducts transmission/reception of information between history management unit 104 and provider client 50. Furthermore, gateway 101 conducts transmission/reception of information between history management unit 104 and manager client 40 and between database management unit 105 and manager client 40.

(2) Database Unit 102

Database unit 102 is structured specifically from a hard disk unit, and stores a user authentication table 110, a user table 120, a content table 130, a decryption key table 140 and a historical table 150, which are pieces of information required in contents management. These tables are described below.

User Authentication Table 110

Figure 3:
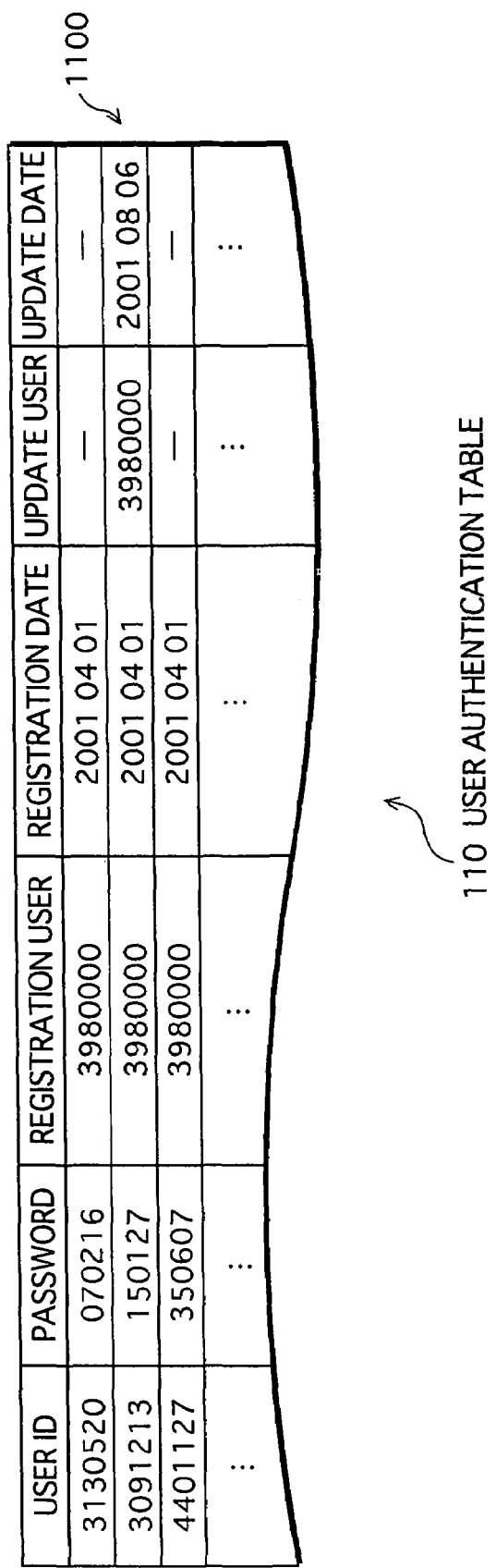
FIG. 3 shows a data structure of a user authentication table 110.

FIG. 3 shows a data structure of user authentication table 110. Table 110 is structured from the same number of pieces of user authentication information as there are users using the system.

The pieces of user authentication information are each structured from a user ID, a password, a registration user, a registration date, an update user and an update date, and correspond one-to-one with the users, user authentication information 1100 being marked as an example in FIG. 3.

The various items will now be described using user authentication information 1100 as an example. User ID "3091213" is a symbol uniquely identifying a user corresponding to user authentication information 1100, and password "150127" is used for user authentication when the user corresponding to user authentication information 1100 attempts to use the system. Registration user "3980000" shows by a user ID the entity that registered user authentication information 1100 in database unit 102, and registration date "20010401" (year/month/day; i.e. 2001, Apr. 1$^{st}$) shows the date on which the entity identified by the registration user registered user authentication information 1100 in database unit 102. Update user "3980000", in the case of the user ID and the password having been overwritten, shows by a user ID the entity that conducted the overwriting, and update date "20010806" shows the date on which the user ID and the password were overwritten by the entity identified by the update user. Here, nothing would have been inscribed in the update user and the update date had the user ID and the password not been overwritten subsequent to user authentication information 1100 being registered in database unit 102.

User Table 120

Figure 4:
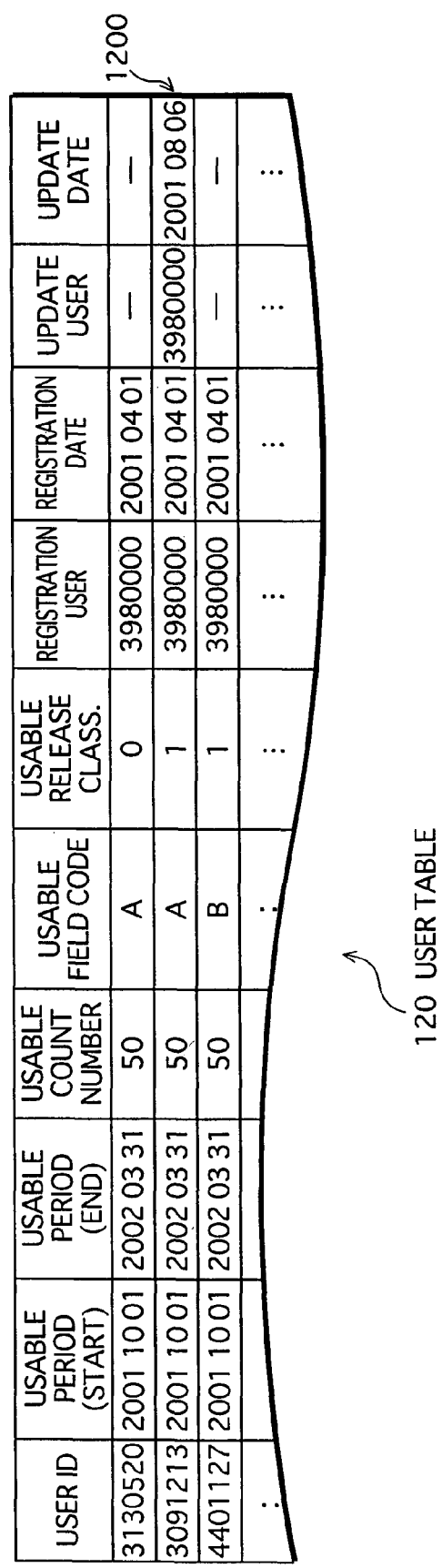
FIG. 4 shows a data structure of a user table 120.

FIG. 4 shows a data structure of user table 120. Table 120 includes the same number of pieces of user information as there are users using the system.

The pieces of user information are each structured from a user ID, a usable period (start), a usable period (end), a usable count number, a usable field code, a usable release classification, a registration user, a registration date, an update user and an update date, and correspond one-to-one with the users.

The various items will now be described using user information 1200 as an example. User ID "3091213" is a symbol uniquely identifying a user corresponding to user information 1200. Usable period (start) "20011001" shows the date on which the user received content usage rights, and usable period (end) "20020331" shows the date on which the content usage rights of the user terminate. Usable count number "50" is the number of contents usable by the user. Usable field code "A" is a symbol showing a field of the contents usable by the user. The usable release classification expresses a numeric value from "0" to "3". Also, as is described in a later section, in each content is set one of the four types of content release classifications (i.e. "0"="open", "1"="secret", "2"="very secret", "3"="top secret",) showing degrees of secrecy. When the usable release classification is "0", the user is able to use contents having a release classification of "0". When the usable release classification is "1", the user is able to use contents having a release classification of "0" and "1". When the usable release classification is "2", the user is able to use contents having a release classification of "0", "1" and "2". When the usable release classification is "3", the user is able to use contents having a release classification of "0", "1", "2" and "3". Registration user "3980000", registration date "20010401", update user "3980000" and update date "20010806" are the same as the items included in user authentication information 1100, and description is thus omitted here.

Content Table 1360

FIG. 5 shows a data structure of content table 130. Table 130 includes the same number of pieces of content information as there are contents stored on recording medium 20 and distributed to users. The pieces of content information are each structured from a content ID, a release period (start), a release period (end), a field code, a release classification, a registration user, a registration date, an update user, an update date and a provider ID, and correspond one-to-one with the contents.

The various items will now be described using content information 1300 as an example. Content ID "B-2002001" is a symbol uniquely identifying a content corresponding to content information 1300.

Release period (start) "20011001" shows the date on which disclosure of the content starts. More specifically, it shows that from Oct. 1, 2001 it is possible to transmit to a user based on a request by the user, a decryption key of an encrypted content generated by encrypting the content. Release period (end) "20020331" shows the date on which disclosure of the content ends. More specifically, it shows that transmission to the user of the decryption key of the encrypted content generated by encrypting the above content ends as of Mar. 31, 2002.

Field code "B" is a symbol showing a field of the content. All contents handled by contents management system 1 are divided according to their respective substance into groups such as "secret key encryption method", "public key encryption method", "image processing", "digital broadcasting" and so forth, these groups being referred to as fields. Field codes are expressed by symbols for identifying each of these fields. Release classification "1" expresses the extent of release restrictions relating to the secrecy of the content, the release classification being expressed by one of numeric values "0", "1", "2" and "3". These numeric values correspond respectively to the secrecy levels "0"="open", "1"="secret", "2"="very secret", "3"="top secret". Registration user "3980000", registration date "20010910", update user "3980000" and update date "20011002" are the same as the items included in user authentication information 1100, and description is thus omitted here. Provider ID "4050917" is a symbol uniquely identifying a provider that created the technical material that is the content corresponding to content information 1300.

Decryption Key Table 140

FIG. 6 shows a data structure of decryption key table 140. Table 140 includes the same number of pieces of decryption key information as there are contents stored on recording medium 20 and distributed to users.

The pieces of decryption key information are each structured from a content ID, a decryption key, a registration user, a registration date, an update user and an update date, and correspond one-to-one with the contents.

The various items will now be described using decryption key information 1400 as an example. Content ID "A-2002001" is a symbol uniquely identifying a content corresponding to decryption key information 1400. Decryption key "Tao5107oFn9" is a decryption key used when the content is decrypted. Registration user "3980000", registration date "20010910", the update user and the update date are the same as the items included in user authentication information 1100, and description is thus omitted here.

Historical Table 150

Figure 7:
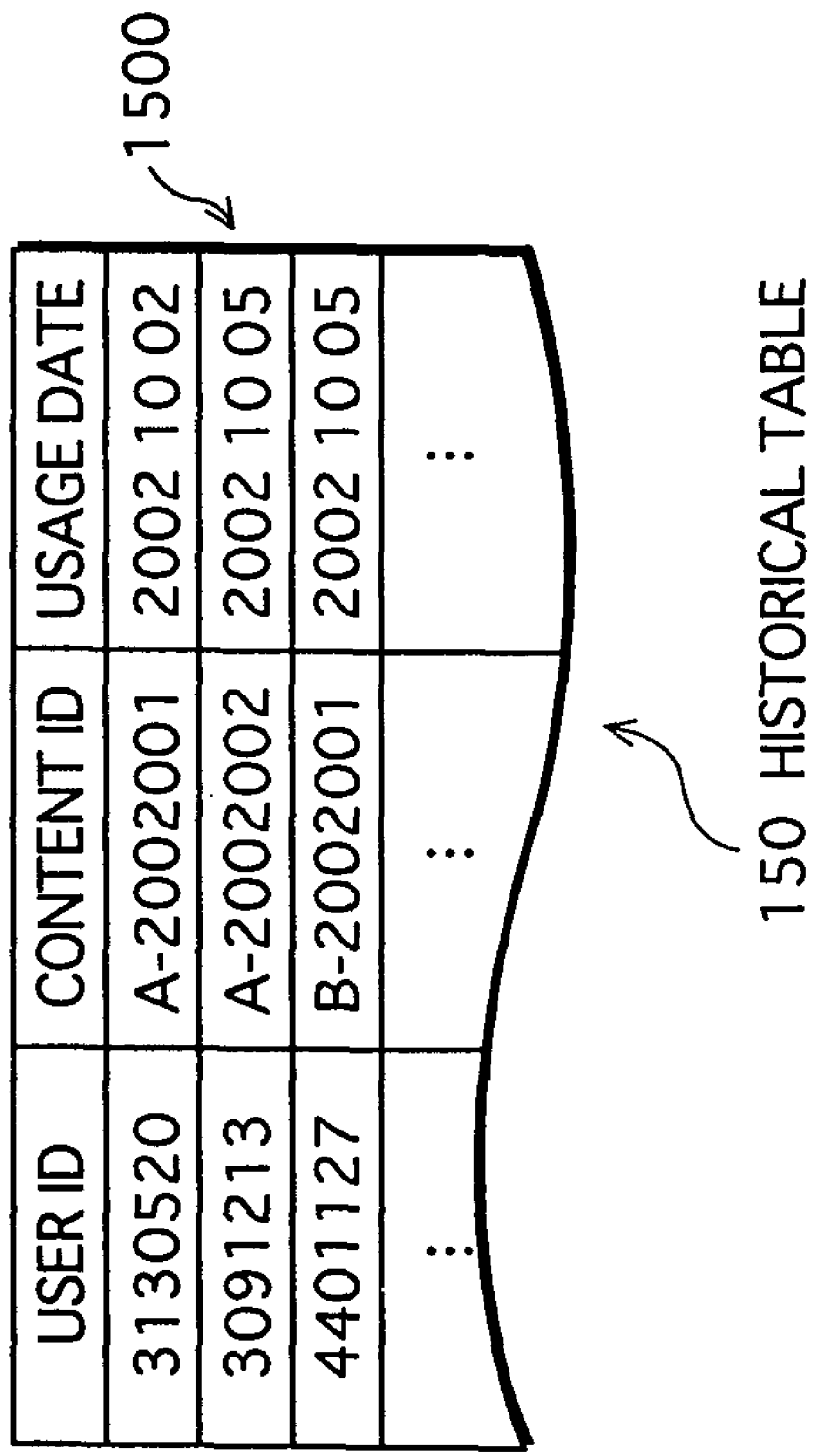
FIG. 7 shows a data structure of a historical table 150.

FIG. 7 shows a data structure of historical table 150. Table 150 includes the same number of pieces of historical information as there are contents that have been used by users.

The pieces of historical information are each structured from a user ID, a content ID and a usage date. The various items will now be described using historical information 1500 as an example. User ID "3091213" is a symbol uniquely identifying a user that used a content corresponding to historical information 1500, and content ID "A-2002002" is a symbol uniquely identifying the content. Usage date "20021005" shows the date on which the user identified by the user ID "3091213" used the content identified by the content ID "A-2002002".

(3) User Authentication Unit 103

User authentication unit 103 is structured from a microprocessor, a RAM and the like.

User authentication unit 103 receives a user ID and a password from user client 30 via gateway 101 and intranet 60. Unit 103 reads user authentication information that includes the received user ID from user authentication table 110 of database unit 102, and conducts user authentication by judging whether the received password is included in the read user authentication information.

User authentication unit 103 transmits an instruction to user client 30 to display an error message showing a password error when authentication is not successful due to the passwords not matching. Unit 103 also transmits an instruction to user client 30 to display an error message showing non-registration when user authentication information that includes the received user ID does not exist.

User authentication unit 103 reads user information that includes the same user ID as the received user ID from user table 120 of database unit 102 when authentication is successful as a result of the passwords matching. Unit 103 refers to the usable period (start) and usable period (end) included in the read user information and judges whether the present time is within the usable period of the user. When judged that the present time is within the usable period, unit 103 transmits an instruction to user client 30 showing that authentication was successful. When judged that the present time is not within the usable period of the user, unit 103 transmits an error message to user client 30 showing that the present time is not within the usable period.

Furthermore, user authentication unit 103 receives a user ID and a content ID from user client 30 via gateway 101 and intranet 60. Unit 103 judges whether to transmit a decryption key of a content corresponding to the received content ID to a user corresponding the received user ID. When judged to transmit a decryption key, user 103 outputs to gateway 101 a decryption key included in decryption key information read from database unit 102. When judged not to transmit a decryption key, user 103 transmits an error message to user client 30. The judgment as to whether or not to transmit a decryption key is described in detail in a later section.

(4) History Management Unit 104

History management unit 104 is structured specifically from a microprocessor, a RAM and the like.

History management unit 104 provides to manager client 40 and provider client 50, information relating to contents whose decryption key has been requested by users.

More specifically, history management unit 104, on receipt of a request from manager client 40, reads historical information from historical table 150 of database unit 102, and transmits the read historical information to manager client 40 via gateway 101 and intranet 60.

Furthermore, history management unit 104, on receipt of a request from provider client 50, reads historical information relating to a content created by the provider, based on content information and historical information stored in database unit 102, and transmits the read historical information to provider client 50 via gateway 101 and intranet 60.

(5) Database Management Unit 105

Database management unit 105 is structure from a microprocessor, a RAM and the like.

Database management unit 105 receive update requests relating to data stored in database unit 102 from manager client 40, reads data stored in database unit 102, and updates the read data in accordance with the update requests.

For example, database management unit 105 extends or reduces a usable period of a user by updating the usable period (end) of user information included in user table 120 of database unit 102. Also, unit 105 extends or reduces a disclosure period of a content by updating the release period (end) of content information included in content table 130 of database unit 102. Again, unit 105 eases release restrictions relating to the secrecy of a content by changing a release classification of content information from "2" to "1", and removes release restrictions by changing a release classification from "1" to "0".

As described above, database management unit 105 updates data included in user authentication information, user information, content information and decryption key information stored in database unit 102, in compliance with update requests received from manager client 40.

(6) Content storage unit 106

Content storage unit 106 is structured from a hard disk unit, and stores a plurality of contents and content IDs in one-to-one correspondence. Contents stored in unit 106 are encrypted by encryption unit 108 and stored on recording medium 20.

(7) Program Storage Unit 107

Program storage unit 107 stores programs and data to be recorded on recording medium 20 together with encrypted contents generated by encryption unit 108. A detailed description of the programs and data is given later. Unit 107 outputs the programs and data to input/output unit 109 in response to requests from input/output unit 109.

(8) Encryption Unit 108

Encryption unit 108 reads a content ID and a content corresponding to the content ID stored in content storage unit 106, and reads decryption key information that includes the same content ID as the read content ID from decryption key table 140 of database unit 102. Unit 108 performs an encryption algorithm $E_1$ using the read decryption key to generate an encrypted content. Here, an exemplary encryption algorithm $E_1$ is DES (data encryption standard). Unit 108 conducts the above processing in relation to all contents stored in content storage unit 106. Unit 108 outputs all encrypted contents to input/output unit 109.

(9) Input/Output Unit 109

Input/output unit 109 is specifically a CD recorder unit, and writes information onto recording medium 20 in the following manner when recording medium 20 is mounted therein.

Input/output unit 109 receives a plurality of encrypted contents from encryption unit 108. Unit 109, on receipt of all of the encrypted contents, writes the encrypted contents, programs and data onto recording medium 20.

2. Recording Medium 20

Recording medium 20 has programs and encrypted contents stored thereon by contents management server 10, and is distributed to users.

Figure 8:
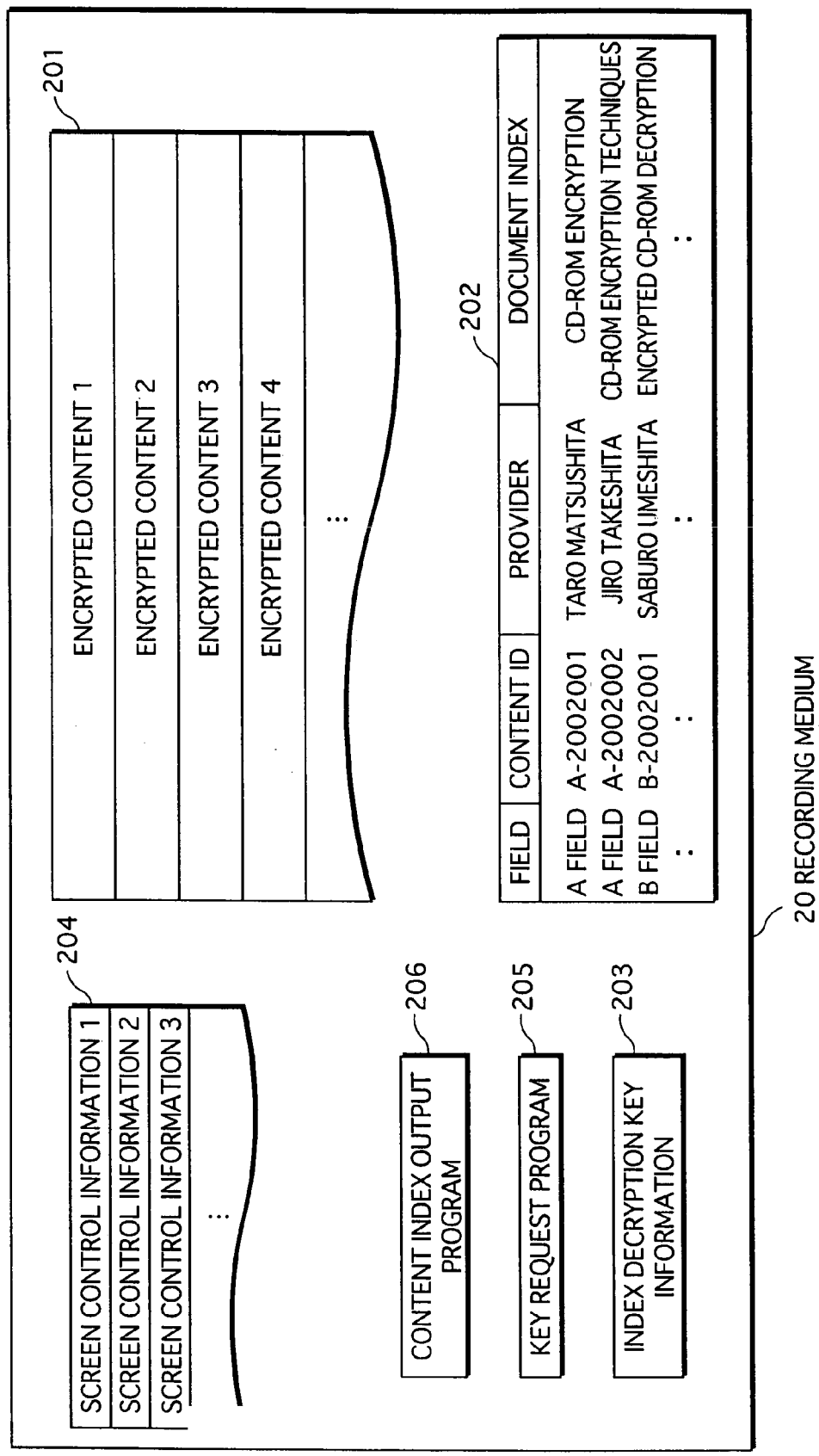
FIG. 8 shows data stored on a recording medium 20.

As shown in FIG. 8, recording medium 20 stores an encrypted contents group 201, an encrypted content index 202, index decryption key information 203, screen control information group 204, a key request program 205 and a content index output program 206. Recording medium 20 is specifically a CD-ROM, and is mounted for use in an input/output unit 306 of user client 30.

Encrypted content 1, encrypted content 2, encrypted content 3, ..., included in encrypted contents group 201 are each a piece of digital data of encrypted contents stored on recording medium 20 by contents management server 10.

Encrypted content index 202 is inscribed per content with a field, a content ID, a provider and a document index in relation to all of the encrypted contents included in encrypted contents group 201. Here, the document index is inscribed with content titles. Also, encrypted content index 202 is encrypted in advance by having encryption algorithm $E_2$ performed thereon. Here, an exemplary encryption algorithm $E_2$ is DES (data encryption standard).

Index decryption key information 203 is a decryption key used for decrypting encrypted content index 202.

Screen control information 1, screen control information 2, screen control information 3, ..., included in screen control information group 204 each correspond to user authentication screen control information, content index screen control information, content search screen control information, search result screen control information, decryption confirmation screen control information and decryption result screen control information. The screen control information is used for generating a user authentication screen 310, a content index screen 320, a content search screen 410, a search result screen 510, a decryption confirmation screen 610 and a decryption result screen 710. The screens are described in detail in a later section.

Key request program 205 and content index output program 206 are executed are follows. When input/output unit 306, having recording medium 20 mounted therein, receives an execution instruction for programs 205 and 206 via an input unit 302 of user client 30 as a result of a user operation, unit 306 reads in programs 205 and 206 and the programs are executed by a control unit 304 of user client 30.

Operations of Key Request Program 205

Figure 9:
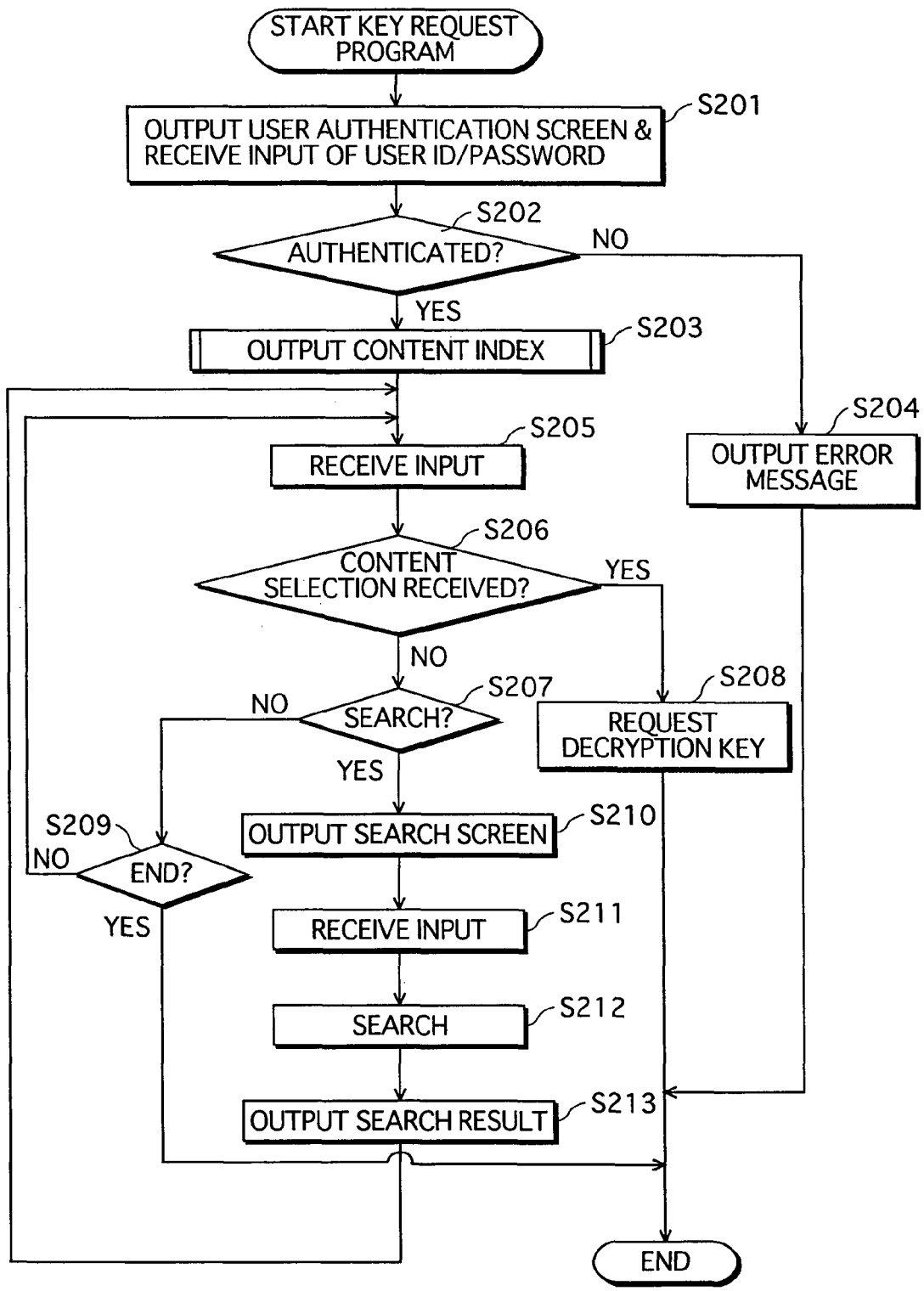
FIG. 9 is a flowchart showing the operations of a key request program.

FIG. 9 is a flowchart showing operations when key request program 205 is executed by control unit 304 of user client 30. A structure of user client 30 is described later using FIG. 11.

Control unit 304 outputs the user authentication screen to a display unit 303, and receives a user ID and a password via input unit 302 (step S201). Unit 304 transmits the received user ID and password to contents management server 10. Unit 304, on receipt of information from contents management server 10 showing a failed authentication (step S202 = NO), outputs an error message to display unit 303 (step S204) and ends the processing.

Control unit 304, on receipt of information from contents management server 10 showing a successful authentication (step S202 =YES), outputs a content index screen to display unit 303 (step S203).

Next, control unit 304 receives a user input via input unit 302 (step S205). Unit 304 judges whether the received input is a content selection. If a content selection (step S206 =YES), unit 304 requests a decryption key from contents management server 10 (step S208) and ends the processing.

If the received input is not a content selection (step S206 =NO), control unit 304 judges whether the received request is a search request. If a search request (step S207 = YES), unit 304 outputs a content search screen to display unit 303 (step S210), and receives a user input via input unit 302 (step S211). Unit 304 searches for a content based on the received input information (step S212), and outputs a search result screen to display unit 303 (step S213). Unit 304 then returns to step S205 and continues the processing.

If the received request is not a search request (step S207 =NO), control unit 304 judges whether the received request is an end request. When an end request is received (step S209 =YES), unit 304 ends the processing. If an end request is not received (step S209 =NO), unit 304 returns to step S205 and continues the processing.

Content Index Output Program 206

Figure 10:
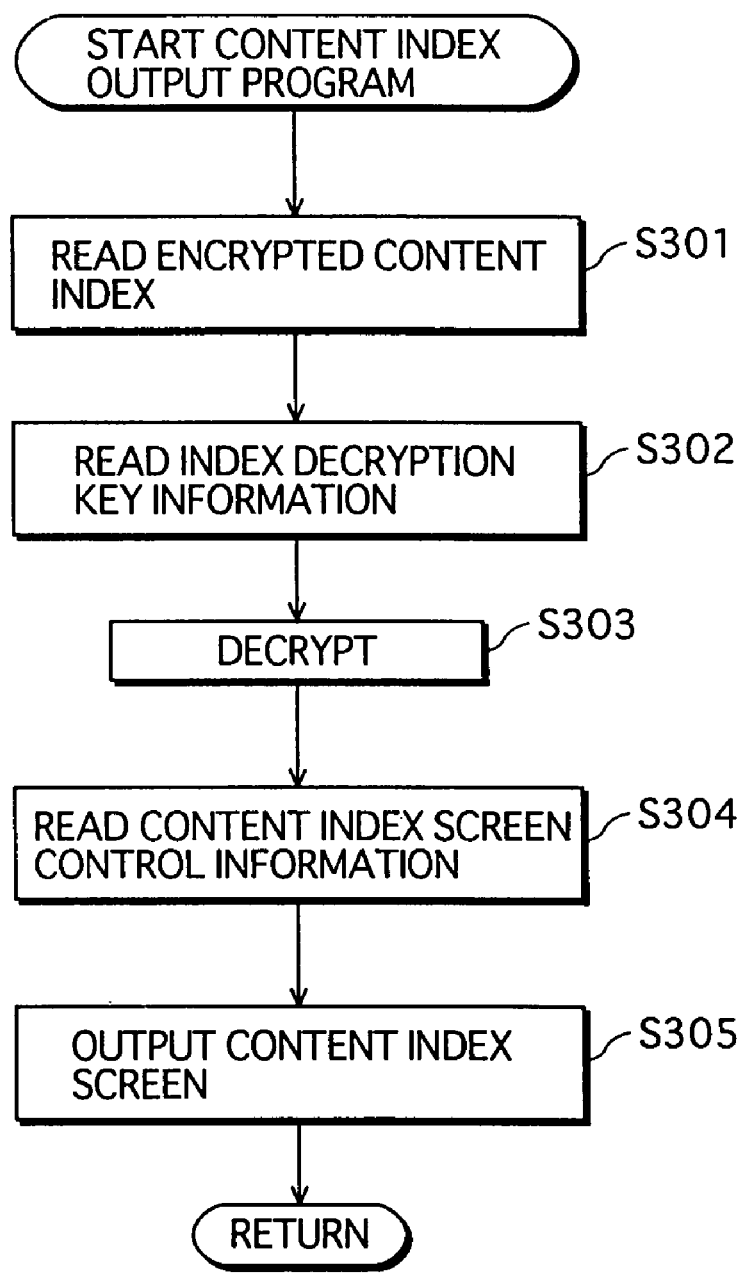
FIG. 10 is a flowchart showing the operations of a content index output program.

FIG. 10 is a flowchart showing operations when content index output program 206 is executed by control unit 304 of user client 30. Program 206 expands on step S203 in the FIG. 9 flowchart.

Control unit 304 reads encrypted content index 202 (step S301). Unit 304 then reads index decryption key information 203 (step S302). Next, unit 304 decrypts encrypted content index 202 using the read index decryption key information (step S303). Next, unit 304 reads content index screen control information (step S304), generates a content index screen from the read content index screen control information and the decrypted content index, and outputs the generated content index screen (step S305).

3. User Client 30

The following description relates to a structure of user client 30.

Figure 11:
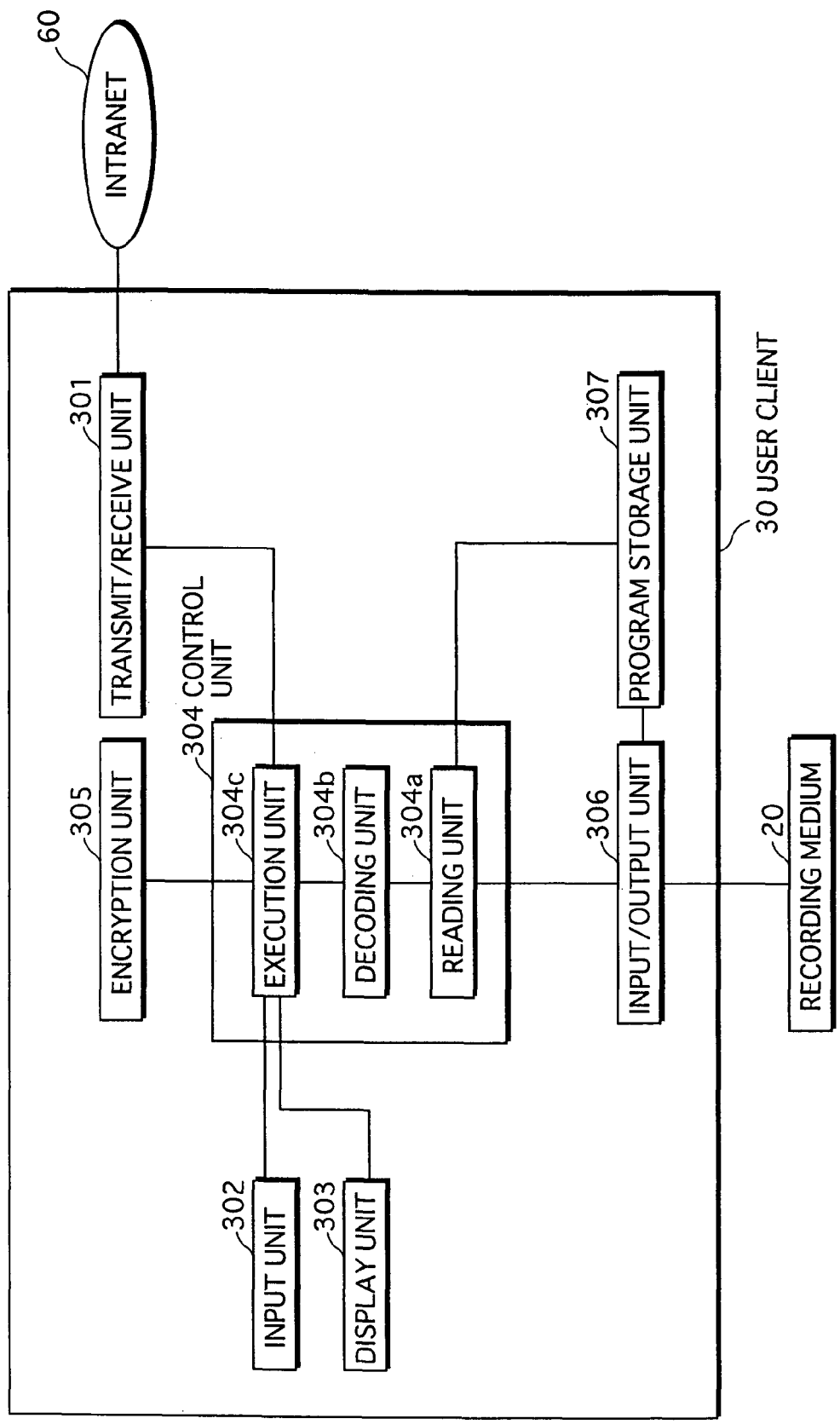
FIG. 11 is a block diagram showing a structure of a user client 30.

FIG. 11 is a block diagram showing a structure of user client 30. As shown in FIG. 11, user client 30 is structured from a transmit/receive unit 301, input unit 302, display unit 303, control unit 304, decryption unit 305, input/output unit 306 and a program storage unit 307. Control unit 304 includes a reading unit 304a, a decoding unit 304b and an execution unit 304c.

User client 30 is specifically a computer system structured from a microprocessor, a ROM, a RAM, a hard disk unit, a display unit, a keyboard, a mouse and so forth, and in the present embodiment is assumed in particular to be a personal computer (PC).

(1) Transmit/Receive Unit 301 Transmit/receive unit 301 conducts transmission and reception of information between execution unit 304c of control unit 304 and contents management server 10. More specifically, unit 301 transmits user IDs, passwords, contents and the like to contents management server 10, and receives decryption keys and the like from contents management server 10.

(2) Input Unit 302

Input unit 302 is specifically a user interface unit such as a keyboard, a mouse and the like. When the keyboard and mouse are operated by a user, unit 302 generates an operation signal corresponding to the operation, and outputs the generated signal to control unit 304.

(3) Display Unit 303

Display unit 303 includes a display, receives screen data from execution unit 304c, and displays the received screen data on the display.

Also, display unit 303 displays substance corresponding to an operation received by input unit 302 on a screen via execution unit 304c. Screens displayed by display unit 303 are user authentication screen 310, content index screen 320, content search screen 410, search result screen 510, decryption confirmation screen 610 and decryption result screen 710. Furthermore, unit 303 receives via control unit 304 contents decrypted by decryption unit 305, and displays the received contents on a display screen.

The following description relates to the various screens.

User Authentication Screen 310

Figure 12:
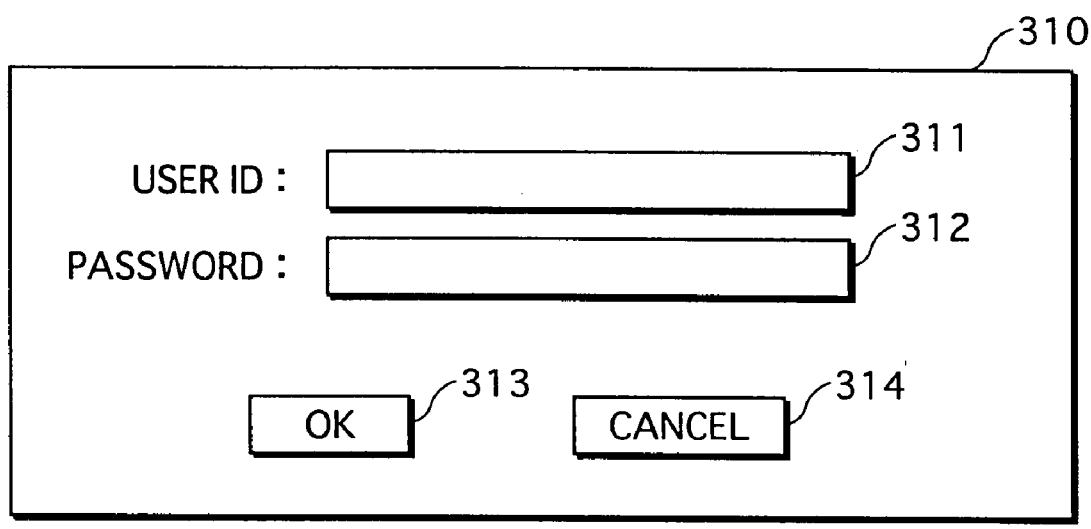
FIG. 12 shows a user authentication screen 310.

User authentication screen 310 is a screen that is displayed every time a user commences using the system. As shown in FIG. 12, screen 310 includes a user ID entry space 311, a password entry space 312, an OK button 313 and a cancel button 314.

Display unit 303 receives via execution unit 304c information received via input unit 302 with respect to user ID entry space 311, and displays the received information in user ID entry space 311. The same applies for password entry space 312. Also, when an input resulting from a mouse click is received in "OK" button 313 or "cancel" button 314, display unit 303 outputs an instruction corresponding to the operation to execution unit 304c of control unit 304.

Content Index Screen 320

Figure 13:
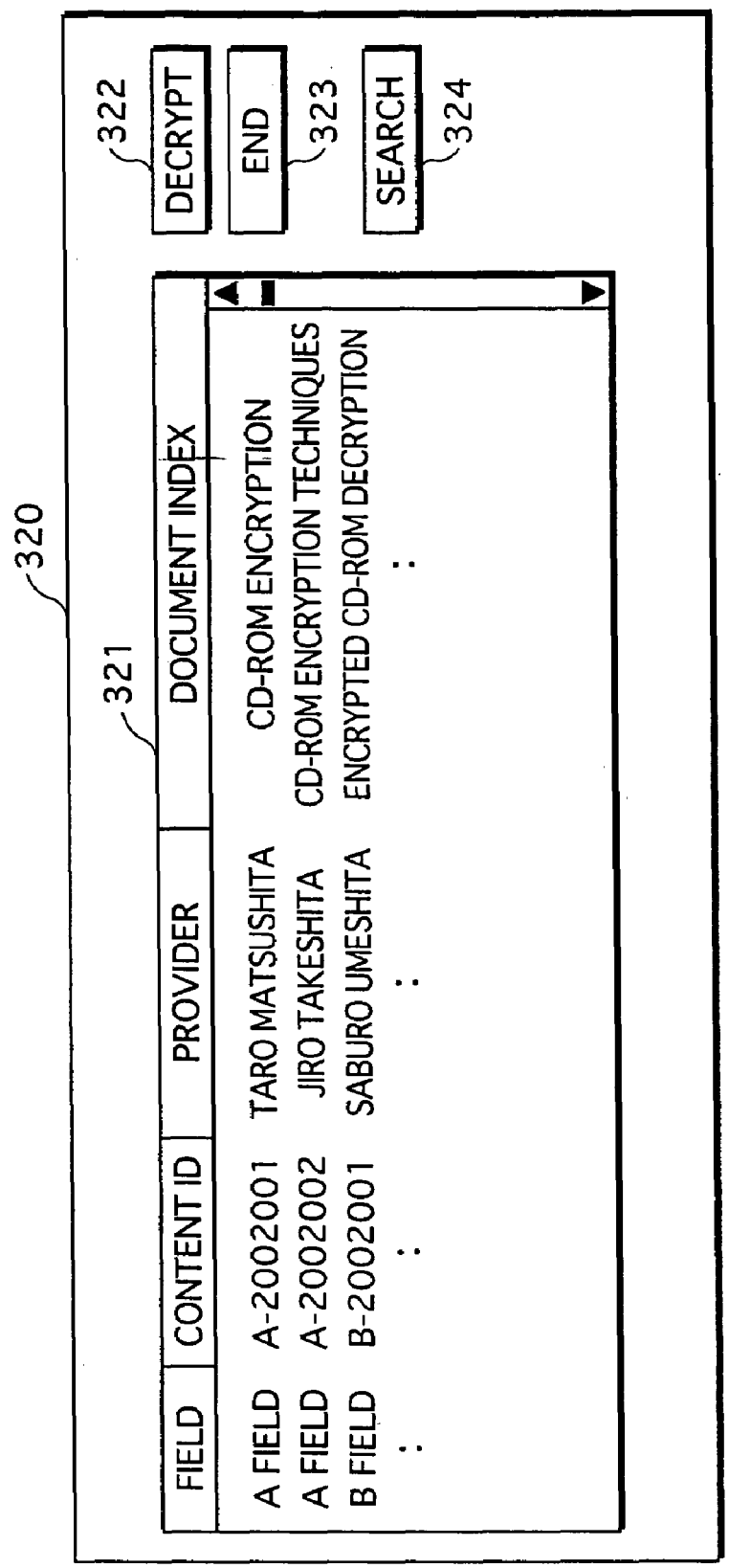
FIG. 13 shows a content index screen 320.

Content index screen 320 is a screen displayed by display unit 303 when user authentication by contents management server 10 is successful. As shown in FIG. 13, screen 320 includes a content index 321, a decryption button 322, an end button 323 and a search button 324.

Content index 321 results from decrypting encrypted content index 202 stored on recording medium 20. Content index 321 has a scroll bar and a scroll button on the right-hand side. Display unit 303, on-receipt of a scroll bar and scroll button operation via input unit 302, scrolls and displays content index 321. Display unit 303, on receipt of an input resulting from a mouse click on one of the contents in content index 321, reverse displays the selected content to show that the content has been selected.

Decryption button 322 is a button used for requesting decryption of contents that have been selected and reverse displayed. End button 323 is a button used for requesting the display of content index screen 320 to be ended. Search button 324 is a button used for requesting a content search.

Content Search Screen 410

Content search screen 410 is a screen displayed by display unit 303 in the case of an input being received as the result of a mouse click on search button 324 when content index screen 320 is being displayed by display unit 303.

Figure 14:
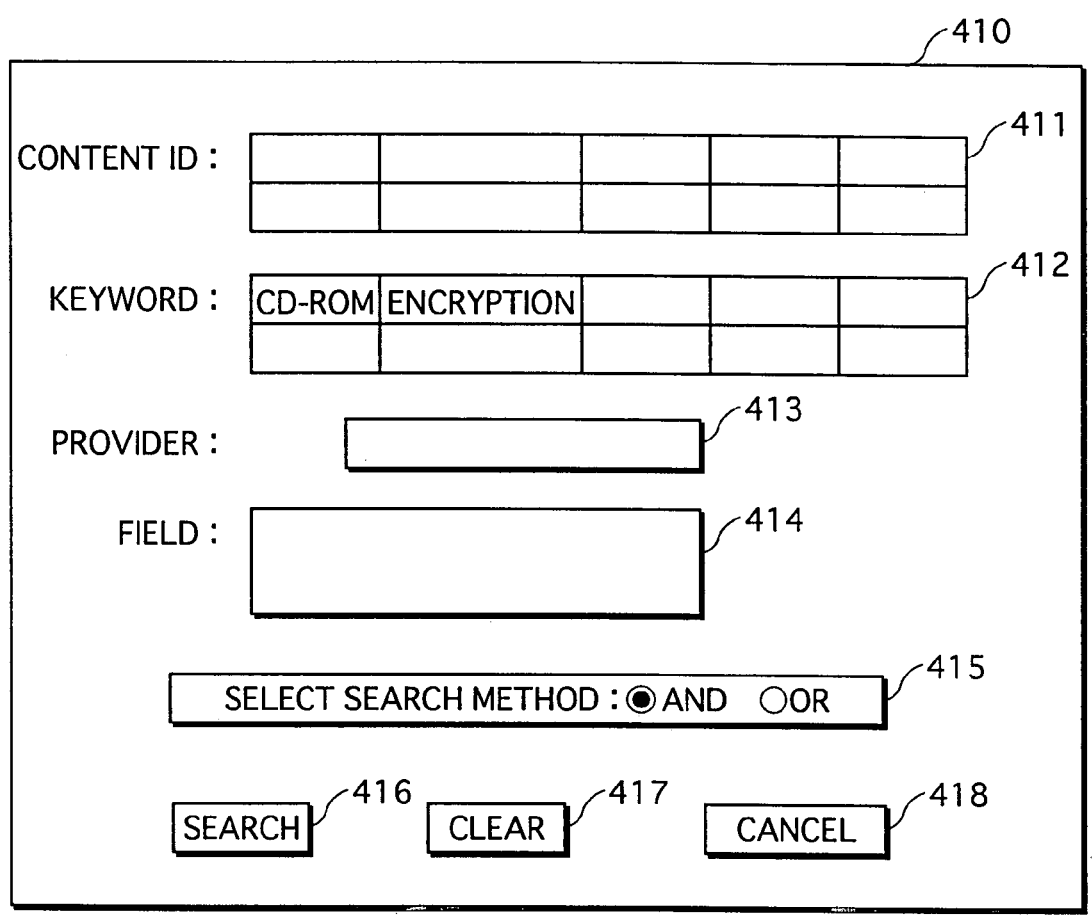
FIG. 14 shows a content search screen 410.

As shown in FIG. 14, content search screen 410 includes a content ID entry space 411, a keyword entry space 412, a provider entry space 413, a field entry space 414, a search method selection space 415, a search button 416, a clear button 417 and a cancel button 418.

Display unit 303 receives information received via input unit 302 with respect to content ID entry space 411, and displays the received information in content ID entry space 411. The same applies for keyword entry space 412, provider entry space 413 and field entry space 414.

Search method selection space 415 has two radio buttons, the radio buttons being used for selecting an "AND" search or an "OR" search. Display unit 303, on receiving an input resulting from a mouse click on the radio buttons, displays a mark showing a selected state in the radio buttons. Here, in search method selection space 415, when one of the radio buttons is selected the other button is unselected.

Search button 416 is a button used for requesting a search when in an inputted condition. Clear button 417 is a button used for requesting a search condition such as a keyword to be discarded. Cancel button 418 is a button used for requesting a content search to be ended.

Search Result Screen 510

Search result screen 510 is a screen displayed by display unit 303 in the case of a search condition being inputted and an input resulting from a mouse click being received on search button 416 when content search screen 410 is being displayed by display unit 303.

Figure 15:
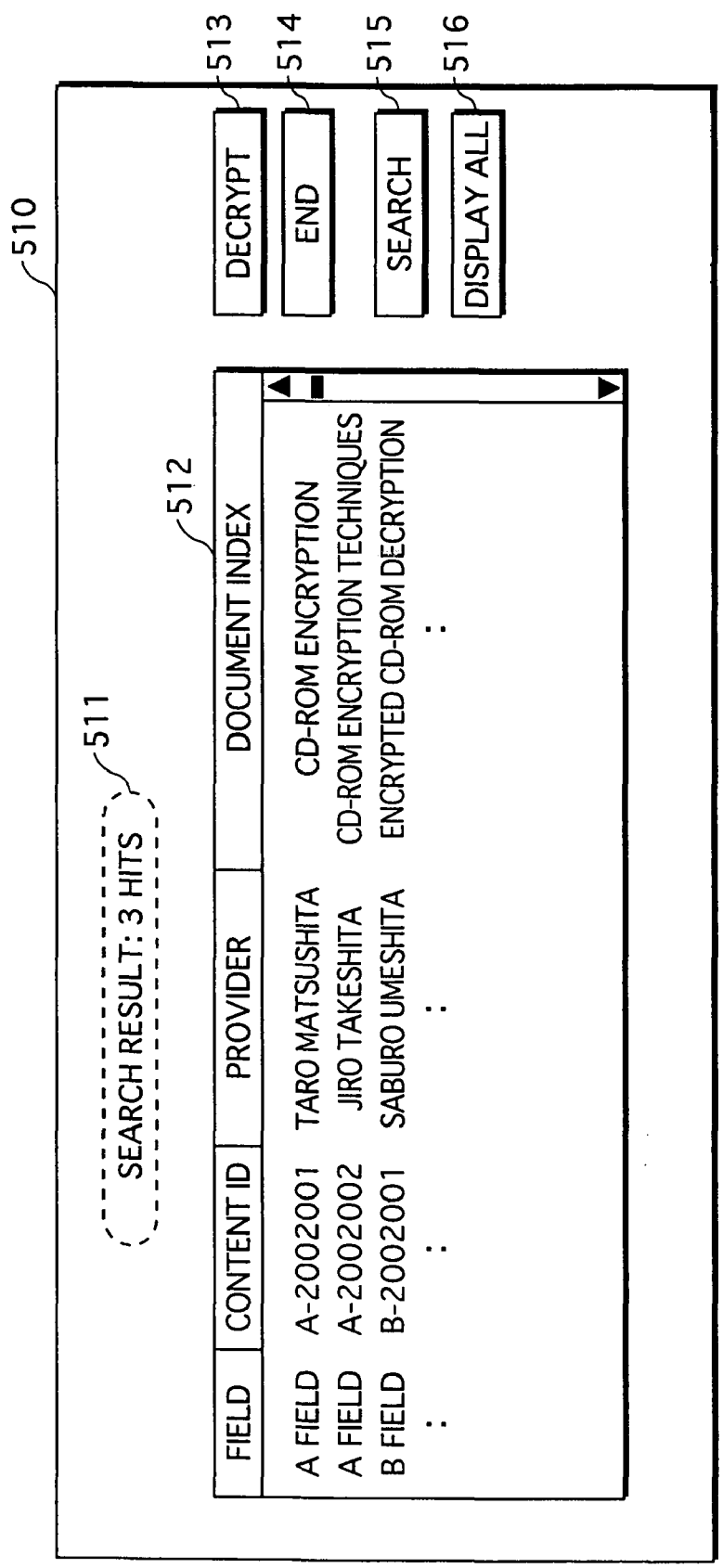
FIG. 15 shows a search result screen 510.

As shown in FIG. 15, search result screen 510 includes a message display area 511, a content index 512, a decrypt button 513, an end button 514, a search button-515 and a display all contents button 516. In message display area 511 is displayed a count number of contents obtained as a result of a search by the message "Search Result: 3 Hits", for example.

Content index 512 is inscribed per content with a field, a content ID, a provider and a document index in relation to all contents obtained as the result of a search. Content index 512 has a scroll bar and a scroll button on the right-hand side. Display unit 303, when the scroll bar and scroll button are operated by input unit 302, scrolls and displays content index 512. Display unit 303, on receipt of an input resulting from a mouse click on one of the contents in content index 512, reverse displays the selected content to show that the content has been selected.

Decryption button 513 is a button used for requesting decryption of contents that have been selected and reverse displayed. End button 514 is a button used for requesting the display of search result screen 510 to be ended. Display all contents button 516 is a button used for requesting the display of a content index in relation to all contents stored on recording medium 20, and on receipt of a display all contents button 516 selection, display unit 303 displays content index-screen 320 described above.

Decryption Confirmation Screen 610

Decryption confirmation screen 610 is a screen displayed in the case of a content selection being made and a decrypt button 322 input being received by input unit 302 when content index screen 320 is being displayed by display unit 303, or in the case of a content selection being made and a decrypt button 513 selection being received by input unit 302 when search result screen 510 is being displayed by display unit 303.

Figure 16:
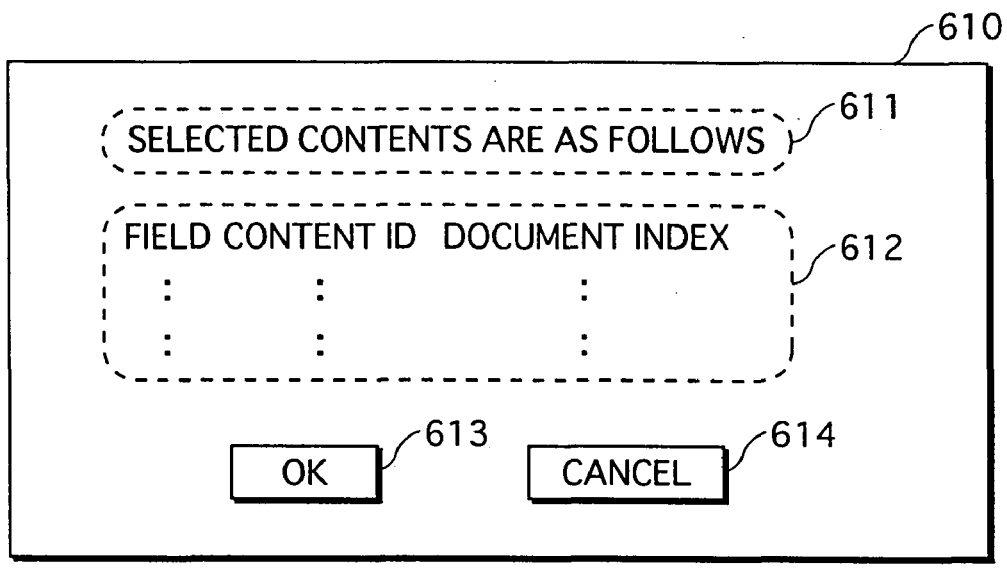
FIG. 16 shows a decryption confirmation screen 610.

Decryption confirmation screen 610, as shown in FIG. 16, includes a message display area 611, a selected content display area 612, an OK button 613 and a cancel button 614.

In message display area 611 is displayed the message "Selected contents are as follows", for example. In selected content display area 612 is displayed per content in content index screen 320 or search result screen 510 a field, a content ID and a document index in relation to all contents whose decryption is requested. Furthermore, when an input resulting from a mouse click is received in OK button 613 or cancel button 614, an instruction corresponding to the operation is outputted to execution unit 304c of control unit 304.

Decryption Result Screen 710

Decryption result screen 710 is a screen displayed in the case of input unit 302 receiving an OK button 613 selection when decryption confirmation screen 610 is being displayed by display unit 303.

Figure 17:
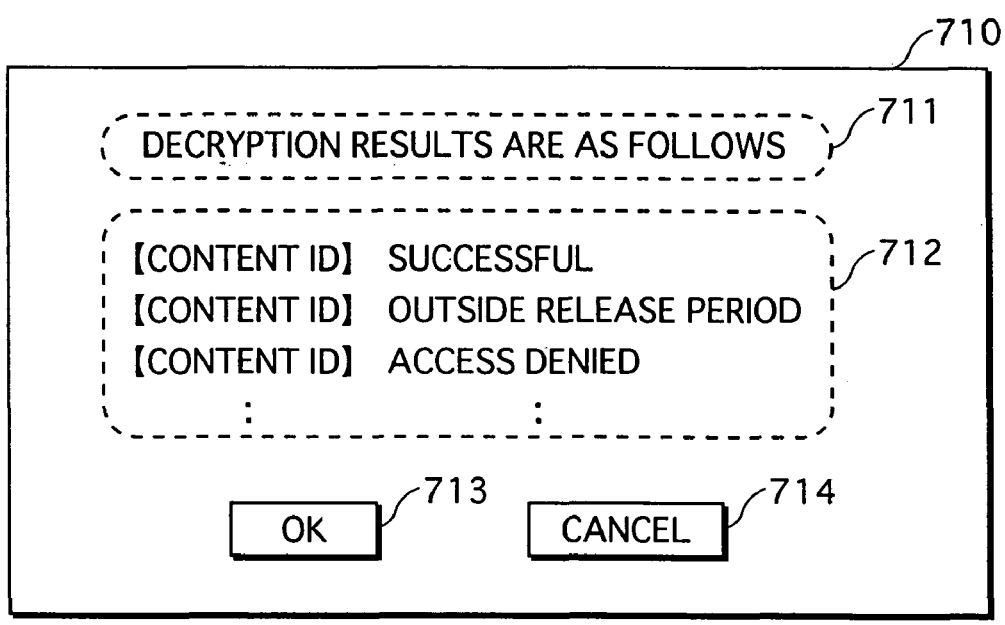
FIG. 17 shows a decryption result screen 710.

Decryption result screen 710, as shown in FIG. 17, includes a message display area 711, a decryption result display area 712, an OK button 713 and a cancel button 714.

In message display area 711 is displayed the message "Decryption results are as follows", for example. In decryption result display area 712 is displayed a content ID and a decryption result in relation to all contents whose decryption was requested. Exemplary decryption results are "Successful", "Outside Release Period" and so forth. Furthermore, when an input resulting from a mouse click is received in OK button 713 or cancel button 714, an instruction corresponding to the operation is outputted to execution unit 304c of control unit 304.

(4) Control Unit 304

Control unit 304 includes reading unit 304a, decoding unit 304b and execution unit 304c, and specifically is structured from a microprocessor, a RAM and the like. The RAM stores a control program, and control unit 304 controls user client 30 by the microprocessor executing the control program.

Control unit 304 generates transmission signals based on input signals received from input unit 302, and transmits the generated transmission signals to contents management server 10 via transmit/receive unit 301 and intranet 60 as well as outputting input information to display unit 303. Furthermore, control unit 304 generates output signals based on reception signals received from contents management server 10 via intranet 60 and transmit/receive unit 301, and outputs the generated output signals to display unit 303.

Control unit 304, on receipt of a request to execute the key request program and the content index output program stored on recording medium 20 as a result of a user input when recording medium 20 is mounted in input/output unit 306, executes the programs stored on recording medium 20 as described below.

First, reading unit 304a outputs an instruction to input/output unit 306 to read the key request program, the content index output program, the encrypted content index, the index decryption key information and the screen control information stored on recording medium 20, and write the read key request program, content index output program, encrypted content index, index decryption key information and screen control information into program storage unit 307. When the above data has been written into program storage unit 307, reading unit 304a sequentially reads the programs from program storage unit 307 and outputs the read programs to decoding unit 304b. Decoding unit 304b receives the programs from reading unit 304a, decodes the received programs, and outputs the decoded programs to execution unit 304c. Execution unit 304c executes the programs decoded by decoding unit 304b.

More specifically, in the key request processing, execution unit 304c generates screen data based on screen control information, and outputs the generated screen data to display unit 303. Execution unit 304c receives an input via input unit 302 requesting selection and decryption of a content, and outputs to transmit/receive unit 301 an content ID corresponding to the received input and a user ID showing the user that made the input. Control unit 304, on receipt of a decryption key from contents management server 10 via transmit/receive unit 301, acquires the encrypted content from input/output unit 306 and outputs the encrypted content to decryption unit 305 together with the decryption key.

In the content index decryption processing, execution unit 304c decrypts an encrypted content index using the index decryption key information.

Execution unit 304c, having executed all of the programs stored in program storage unit 307, outputs an instruction to program storage unit 307 to discard all of the stored programs and data, and program storage unit 307 discards the programs and data.

(5) Decryption Unit 305

Decryption unit 305 is structured from a microprocessor, a RAM and the like. The RAM stores a decryption program, and unit 305 decrypts encrypted contents as a result of microprocessor executing the decryption program.

Decryption unit 305 receives a decryption key and an encrypted content from control unit 304. Unit 305 performs an inverse of a base 64 conversion on the received decryption key. Unit 305 performs a decryption algorithm $D_1$ on the encrypted content using the decryption key on which the inverse base 64 conversion has been performed to decrypt the encrypted content. Here, decryption algorithm $D_1$ is an algorithm for decrypting ciphertext generated using encryption algorithm $E_1$. Also, unit 305 outputs the decrypted content to control unit 304.

(6) Input/Output Unit 306

Input/output unit 306 is specifically a CD-ROM drive unit, and when recording medium 20, which is a CD-ROM, is mounted therein, unit 306 reads the key request program, the content index output program, the encrypted content index, the index decryption key information and the screen control information stored on recording medium 20 and outputs the read programs and data to program storage unit 307.

Furthermore, input/output unit 306, when control unit 304 receives a decryption key from the contents management server, reads an encrypted content stored on recording medium 20 and outputs the read encrypted content to decryption unit 305 via control unit 304.

(7) Program Storage Unit 307

Program storage unit 307 is specifically a RAM, and temporarily stores the key request program, the content index output program, the encrypted content index, the index decryption key information and the screen control information read from recording medium 20 by input/output unit 306. Unit 307, when execution processing of the key request program and the content index output program is completed, discards all of the stored programs and data.

4. Manager Client 40

Manager client 40 is a device used by the manager of contents management system 1. The manager client is specifically a personal computer. Since manager client 40 has the same structure as user client 30, the structure of manager client 40 is not depicted.

Manager client 40, on receipt of an input resulting from an operation by the manager, transmits a signal to contents management server 10 requesting historical information, and receives historical information from contents management server 10. Furthermore, manager client 40, on receipt of an input resulting from a manager operation, updates data stored in database unit 102 of contents management server 10. A detailed description is given later.

5. Provider Client 50

Provider client 50 is a device used by the provider of contents stored on recording medium 20, and is specifically a personal computer. Provider client 50 has the same structure as user client 30, and thus the structure of provider client 50 is not depicted. Provider client 50, on receipt of an input resulting from an operation by the provider, transmits a signal to contents management server 10 requesting historical information, and receives historical information from contents management server 10. A detailed description is given later.

Operations

The follow description relates to the operations of contents management system 1, with reference to the drawings.

1. Overall Operations

Figure 18:
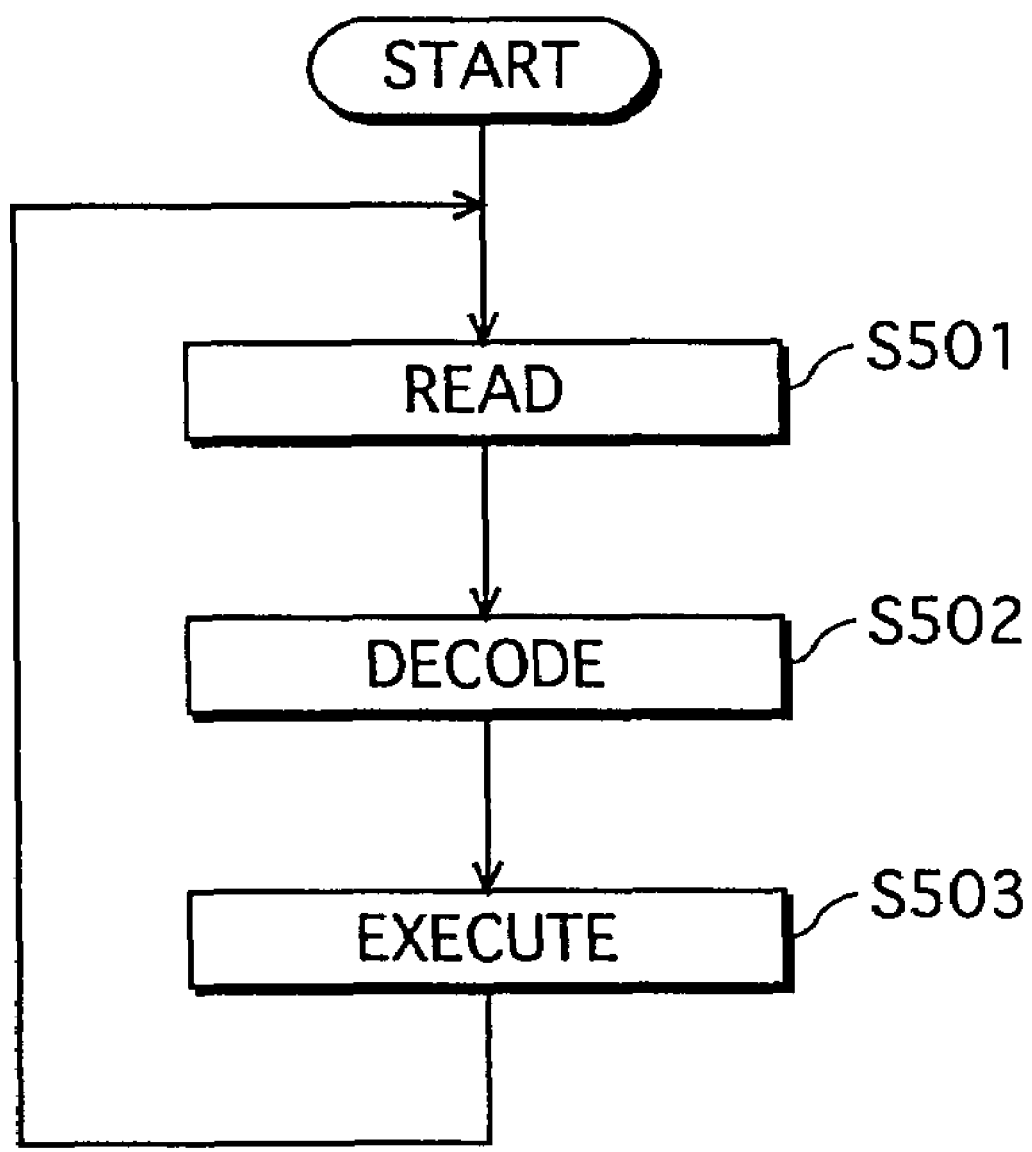
FIG. 18 is a flowchart showing the overall operations performed in contents management system 1.

The overall processing performed in contents management system 1 is realized, as shown in the FIG. 18 flowchart, by a microprocessor reading a program (step S501), decoding the read program (step S502), and executing the decoded program (step S503).

Figure 19:
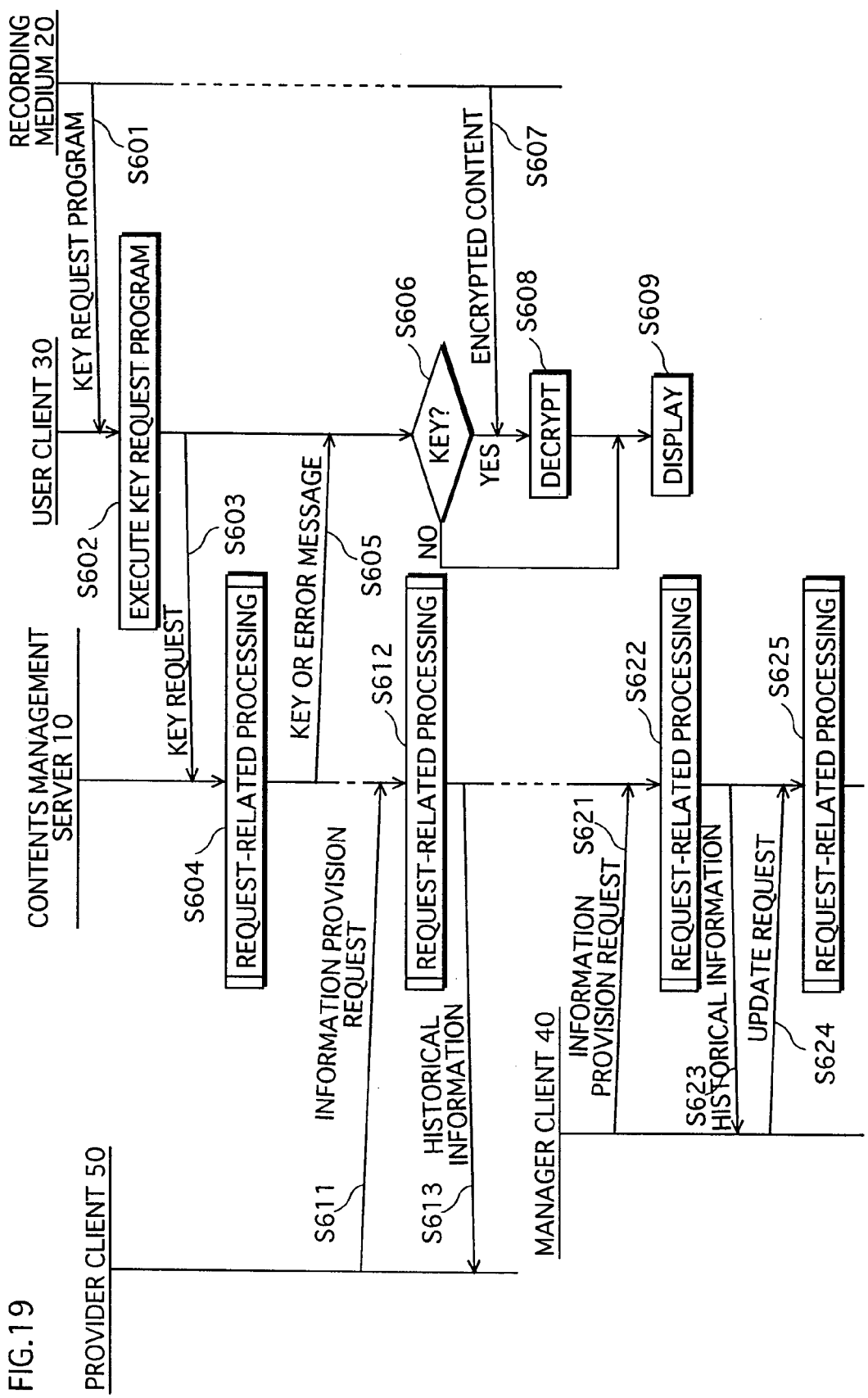
FIG. 19 is a flowchart showing content disclosure processing operations performed in contents management system 1.

FIG. 19 is a flowchart showing the overall operations of contents management system 1.

User client 30 reads the key request program stored on recording medium 20 (step S601). User client 30 executes the read key request program (step S602). Next, user client 30 transmits a signal to contents management server 10 requesting a decryption key of a content, and contents management server 10 receives the signal (step S603). Contents management server 10 conducts processing in response to the request (step S604). Contents management server 10 transmits a decryption key or an error message to user client 30, and user client 30 receives the decryption key or error message (step S605). In the case of a decryption-key being received (step S606 =YES), user client 30 reads an encrypted content from recording medium 20 (step S607), decrypts the read encrypted content using the decryption key (step S608). User client 30 displays a decrypted content or the error message (step S609).

Provider client 50 transmits a signal to contents management server 10 showing an information provision request, and contents management server 10 receives the signal (step S611). Contents management server 10 conducts processing in response to the request (step S612). Contents management server 10 transmits historical information to provider client 50, and provider client 50 receives the historical information (step S613).

Manager client 40 transmits a signal to contents management server 10 showing an information provision request, and contents management server 10 receives the signal (step S621). Contents management server 10 conducts processing in response to the request (step S622). Contents management server 10 transmits historical information to manager client 40, and manager client 40 receives the historical information (step S623). Furthermore, manager client 40 transmits a signal to contents management server 10 showing an update request, and contents management server 10 receives the signal (step S624). Contents management server 10 conducts processing in response to the request (step S625).

2. Operations of Contents Management Server 10

The following description relates to the operations of contents management server 10.

Figure 20:
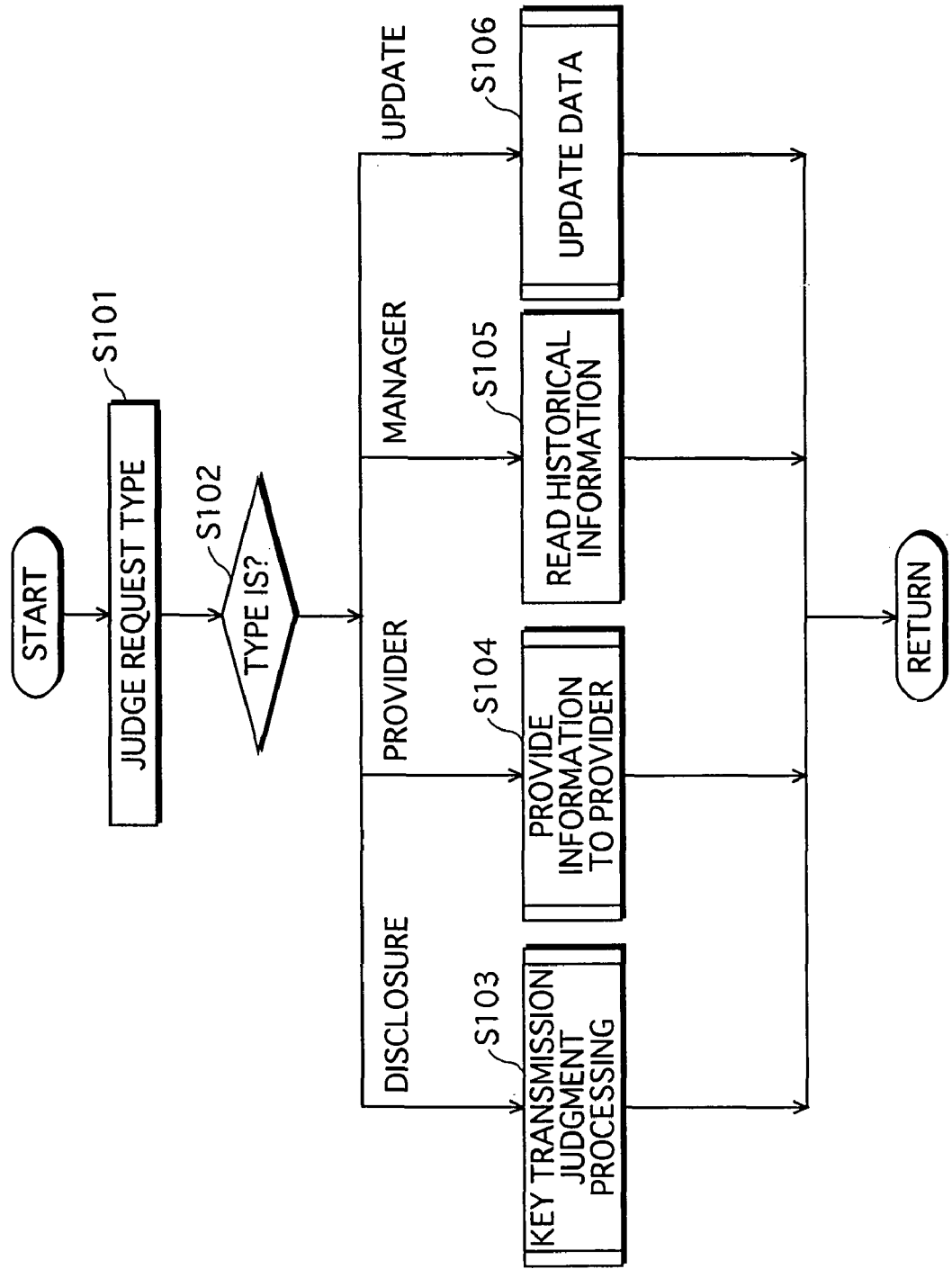
FIG. 20 is a flowchart showing decryption key request processing operations performed in a control unit 304 of user client 30.

The flowchart shown in FIG. 20 shows in detail the operations in steps S604, S612, S622 and S625 of the flowchart shown in FIG. 19.

Contents management server 10 judges the type of request shown by a received signal (step S101). If the received signal requests "content disclosure" ("disclosure" at step S102), contents management server 10 conducts key transmission judgment processing (step S103). If the received signal requests "information provision to provider" ("provider" at step S102), contents management server 10 conducts provider information provision processing (step S104). If the received signal requests "information provision to manager" ("manager" at step S102), history management unit 104 reads all of the historical information included in historical table 150 stored in database unit 102 (step S105). If the received signal requests "data update" ("update" at step S102), database management unit 105 conducts data update processing (step S106).

3. Key Transmission Judgment Processing Operations

Figure 21:
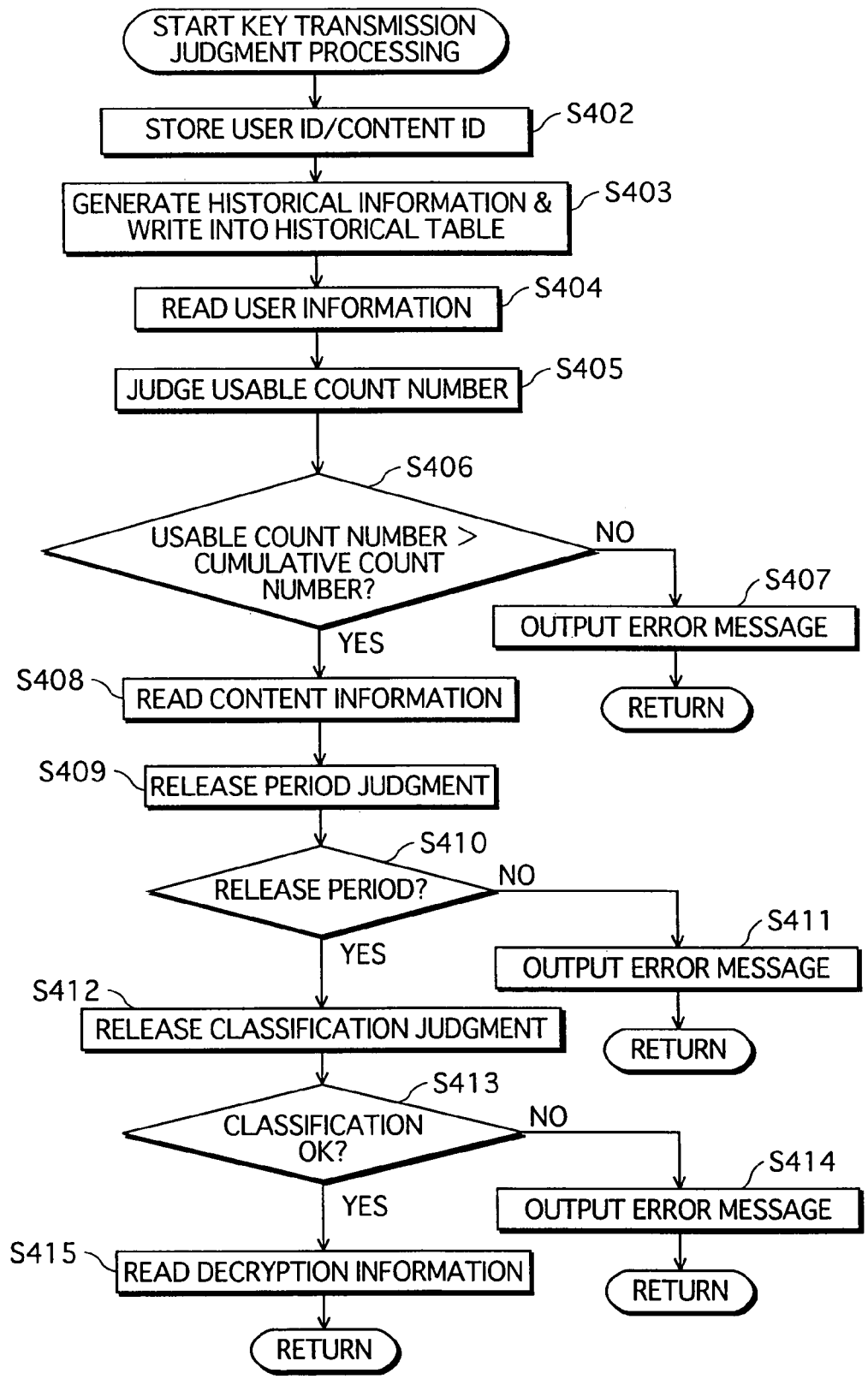
FIG. 21 is a flowchart showing key transmission judgment processing operations performed in contents management server 10.

FIG. 21 is a flowchart of key transmission judgment processing operations. The operations described here expand on step S103 in the FIG. 20 flowchart.

User authentication unit 103 in contents management server 10 receives a content ID and a user ID via gateway 101 and stores the received content ID and user ID (step S402). User authentication unit 103 generates historical information and adds the generated historical information to historical table 150 of database unit 102 (step S403).

User authentication unit 103 calculates the cumulative count number of contents already used by the user, using historical table 150 stored in database unit 102. Unit 103 reads user information that includes the same user ID as the received user ID from user table 120 of database unit 102 (step S404). Unit 103 conducts a usable count number judgment by comparing the calculated cumulative count number with the usable count number included in the read user information (step S405). When the usable count number is less than or equal to the cumulative count number (step S406=NO), unit 103 outputs an error message notifying that the usable count number has already been exceeded (step S407), and continues the processing. When the usable count number is greater than the cumulative count number (step S406=YES), unit 103 reads content information that includes the same content ID as the received content ID from content table 130 of database unit 102 (step S408).

User authentication unit 103 reads the release period (start) and the release period (end) included in the read content information and judges whether a present time is within the release period (step S409). When the present time is not within the release period (step S410=NO), unit 103 outputs an error message notifying that now is not the release period (step S411) and continues the processing. When the present time is within the release period (step S410=YES), unit 103 reads the usable release classification included in the stored user information and the release classification included in the content information, and conducts a release classification judgment (step S412). When the usable release classification does not include the release classification (step S413 =NO), user 103 outputs an error message showing that a release classification usable by the user is not included (step S414) and continues the processing. When the usable release classification does include the release classification (step S413 =YES), user 103 reads decryption key information corresponding to the content from decryption table 140 of database unit 102 (step S415).

4. Provider Information Provision Processing Operations

Figure 22:
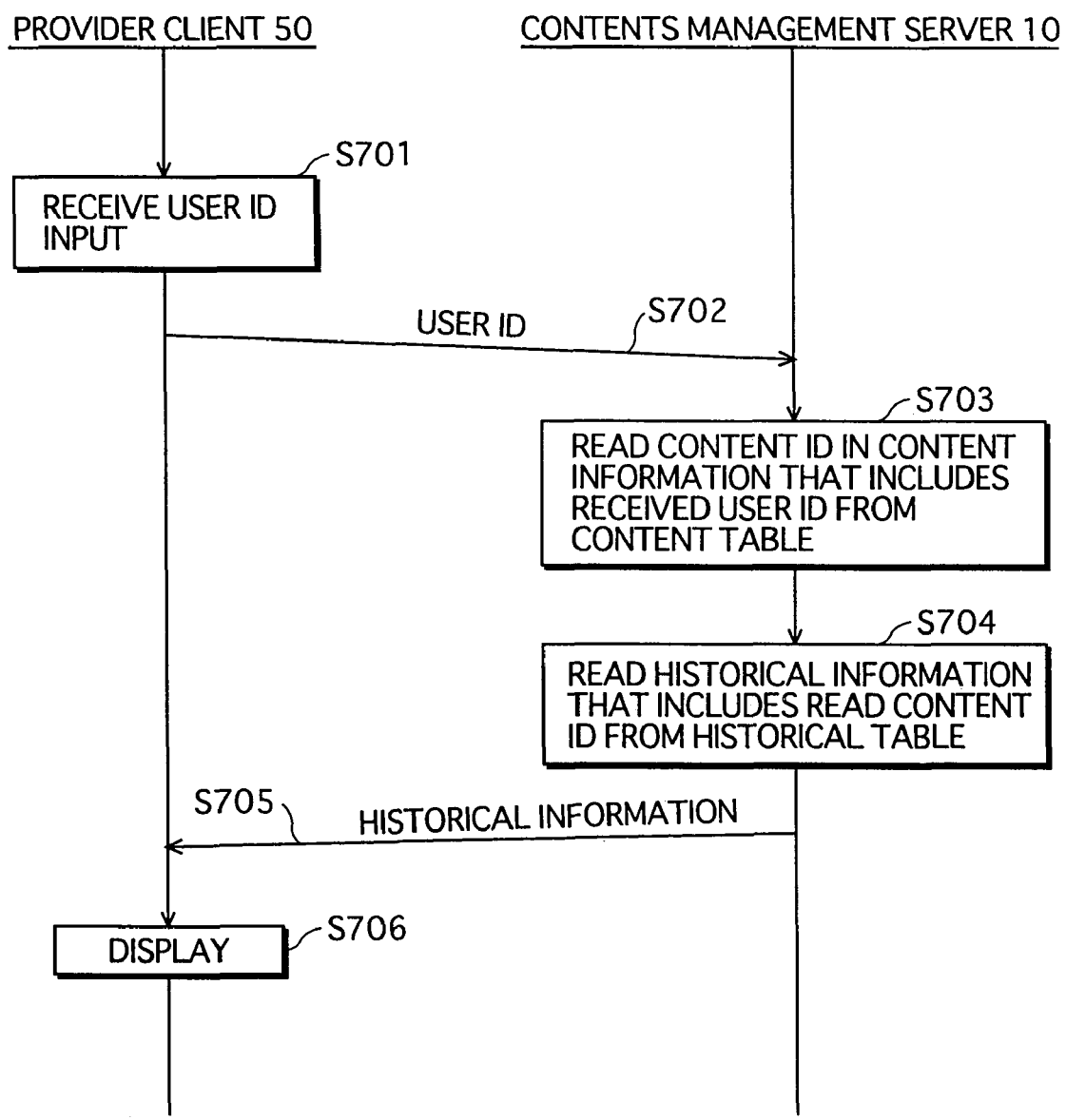
FIG. 22 is a flowchart showing historical information provision processing operations performed in contents management system 1.

FIG. 22 is a flowchart showing the operations of contents management server 10 and provider client 50 in the provider information provision processing. The operations shown here expand on step S104 of the flowchart shown in FIG. 20.

Provider client 50 receives input of a user ID from the provider (step S701). Provider client 50 transmits the received user ID to contents management server 10 via intranet 60, and contents management server 10 receives the user ID (step S702). Next, history management unit 104 in contents management server 10 reads the content IDs included in all of the content information that includes the received user ID (step S703).

Next, history management unit 104 transmits all of the historical information that includes the read content IDs from historical table 150 of database unit 102 (step S704). History management unit 104 transmits the read historical information to provider client 50 via gateway 101 and intranet 60, and provider client 50 receives the historical information (step S705). Provider client 50 displays the received historical information on a display unit (step S706).

5. Data Update Processing Operations

Figure 23:
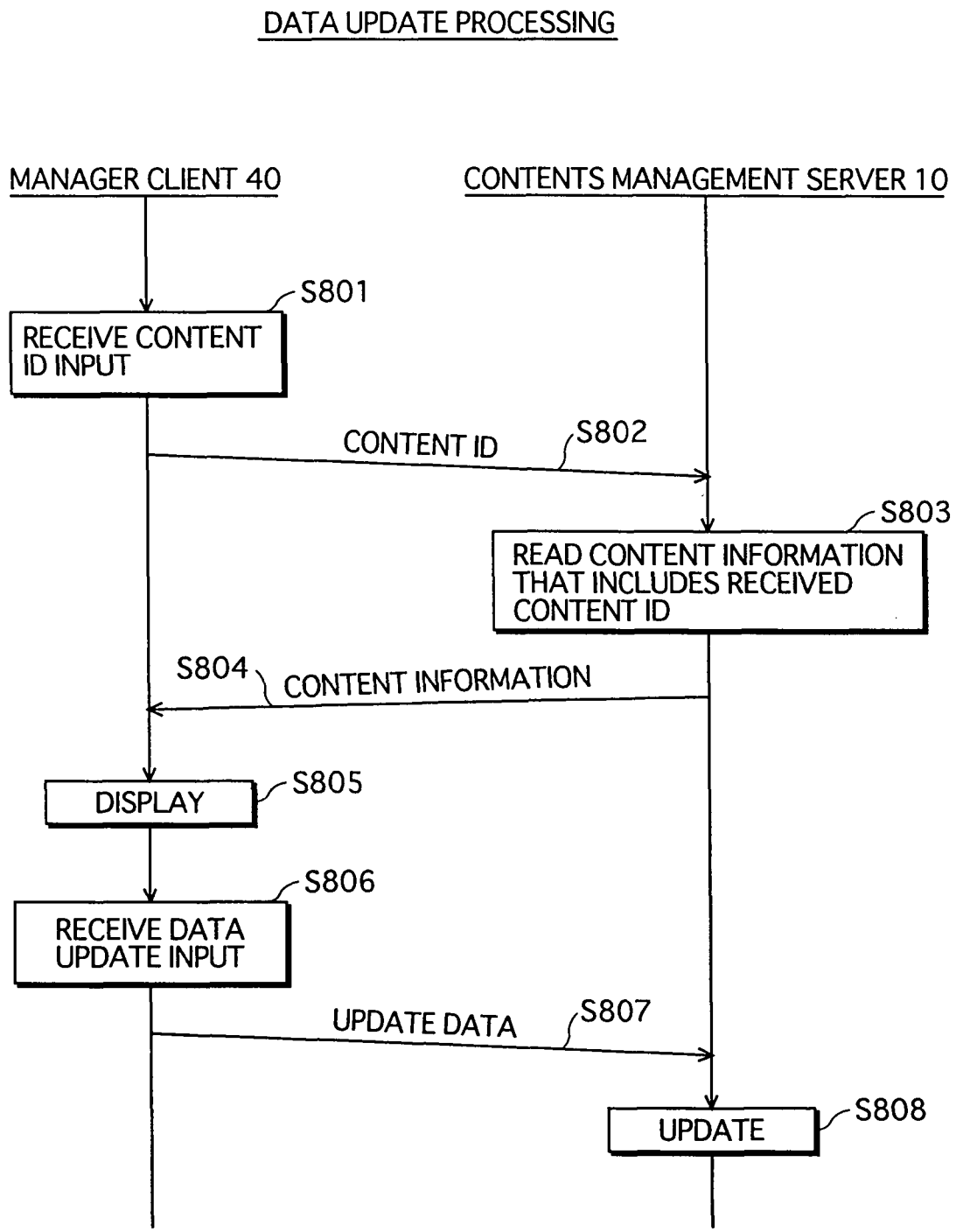
FIG. 23 is a flowchart showing data update processing operations performed in contents management system 1.

FIG. 23 is a flowchart showing the operations of contents management server 10 and manager client 40 in the data update processing of data stored in database unit 102 of contents management server 10.

Manager client 40 receives input of a content ID (step S801). Manager client 40 transmits the received content ID to contents management server 10 via intranet 60, and contents management server 10 receives the content ID (step S802). Database management unit 105 in contents management server 10 reads content information that includes the received content ID from content table 130 of database unit 102 (step S803). Database management unit 105 transmits the read content information to manager client 40 via gateway 101 and intranet 60, and manager client 40 receives the content information (step S804). Manager client 40 displays the received content information on a display unit (step S805), and receives input of data for use in updating (step S806). Manager client 40 transmits the received update data to database management unit 105 of contents management server 10 via intranet 60 and gateway 101, and database management unit 105 receives the update data (step S807). Database management unit 105 then updates corresponding data based on the received update data (step S808).

SUMMARY

As described above, the present invention is a contents management system that is able to control the disclosure of contents according to release periods, release classifications and the like as a result of contents management server 10 managing information relating to contents and users, with respect to encrypted contents stored on recording medium 20 and distributed to users.

The present invention is a system for dynamically and sensitively managing the disclosure of contents, and that enables contents management server 10, on receiving a request from a manager, to change individual items included in content information, user information and the like, and enables control of content disclosure using data immediately following a change.

Also, contents management server 10 accumulates and manages contents whose disclosure has been requested and information relating to users that make requests.

Furthermore, programs for requesting the decryption keys of encrypted contents are stored on recording medium 20 together with encrypted contents, and key request processing is realized by control unit 304 in user client 30 reading and executing the programs stored on recording medium 20.

Variations (1) Although in the above embodiment, contents management server 10, user client 30, manager client 40 and provider client 50 are connected via intranet 60, a system structured from the above devices in which the devices are connected via the Internet is also included in the present invention.

Furthermore, although "contents" in the above embodiment refers to technical material in PDF file format managed by an enterprise, contents according to the present invention are of course not limited to this. Contents may be character data, music data, image data, video data and other types of digital data.

Take material used in a conference presentation as a specific example of a content. At a conference involving many participants it may be desired to distribute the material to participants in advance. To achieve this, the presentation material is encrypted and stored on a CD-ROM, and the CD-ROM is distributed to participants in advance. Disclosure of the presentation material prior to the conference is avoided as a result of contents management server 10 setting the release period (start) of the content to the date on which the conference commences.

As seen above, the present invention is useful in cases in which material needs to be distributed beforehand but with the material's substance being kept secret until a predetermined date-time.

(2) Although in the above embodiment, there is only one of each of user client 30 and provider client 50, a structure in which a plurality of user clients and provider clients are connected to contents management server 10 via intranet 60 is included in the present invention.

(3) Although in the above embodiment, encrypted contents, programs and data are stored on a CD-ROM, a recording medium used in the present invention is of course not limited to a CD-ROM. A structure in which the above programs and data are stored on a floppy disk, an MO, a DVD-ROM, a DVD-RAM or a similar computer-readable recording medium is also acceptable.

(4) Also included in the present invention is a structure in which a manager of contents management system 1 and a provider that creates contents also have a user ID and a password, receive distribution of encrypted contents stored on a recording medium, and are able to use contents.

(5) Although in the above embodiment, content information is updated in the data update processing, information capable of being updated is not limited to content information. Of the information stored in database unit 102, user authentication information, user information, content information and decryption key information is updateable. A structure in which these types of information are updated is also included in the present invention.

(6) Although the above embodiment is structured such that decryption keys transmitted from contents management server 10 to user client 30 are transmitted to user client 30 via intranet 60 after base 64 convention being performed thereon by contents management server 10, a structure in which decryption keys are transmitted to user client 30 via intranet 60 after contents management server 10 encrypts the decryption keys using a secret key encryption scheme or a public key encryption scheme is also acceptable. In this case, user client 30, on acquiring a decryption key encrypted using a shared secret key from contents management server 10, decrypts the encrypted decryption key using the secret key to generate a decryption key. Furthermore, user client 30, on acquiring a decryption key encrypted using a public key from contents management server 10, decrypts the encrypted decryption key using a secret key of user client 30 to generate a decryption key.

(7) In the above embodiment, a key request program and a content index output program stored on recording medium 20 cannot be installed in user client 30, and only by control unit 304 in user client 30 reading from recording medium 20 and executing the programs is it possible to request a decryption key from contents management server 10.

Furthermore, a structure in which the key request program and the content index output program can only be read using user client 30 by a bona fide user that has a license is acceptable. As such, it is not possible to read the key request program and the content index output program used for requesting a decryption key, even if all of the data and programs stored on recording medium 20 are copied onto another recording medium or a HDD, and thus encrypted contents can be managed safely since it is impossible to acquire decryption keys.

(8) Although in the above embodiment, historical information relating to a user is generated and added to a historical table when a decryption key for an encrypted content is requested of contents management server 10 as a result of user client 30 executing the key request program, a structure in which contents management server 10 generates the historical information of a user to which a decryption key has been transmitted and adds the generated historical information to a historical table is also acceptable.

(9) The present invention may be a method of the above. Moreover, the method may be a program realized by a computer, or a digital signal formed from the program.

Furthermore, the present invention may be a floppy disk, a hard disk, a CD-ROM, an MO, a DVD-ROM, a DVD-RAM, a semiconductor memory or similar computer-readable recording medium storing the program or the digital signal. Moreover, the program or digital signal recorded onto such a recording medium may be transmitted via a network or the like, representative examples of which include a telecommunication circuit, a radio or cable communication circuit, and the Internet.

Furthermore, the present invention may be a computer system that includes a microprocessor and a memory, the memory storing the program and the microprocessor operating in compliance with the program.

Furthermore, the present invention may be put into effect by another independent computer system as a result of transferring the program or the digital signal, either recorded on the recording medium or via a network or the like.

(10) The present invention may be any combination of the above embodiment and variations.

Although the present invention has been fully described by way of examples with reference to the accompanying drawings, it is to be noted that various changes and modifications will be apparent to those skilled in the art. Therefore, unless such changes and modifications depart from the scope of the present invention, they should be construed as being included therein.

What is claimed is:

1. A contents management system in which a playback device plays an encrypted content stored on a portable recording medium, using a decryption key acquired from a management device, comprising:

the management device, holds the decryption key for decrypting the encrypted content in correspondence with disclosure information relating to disclosure of the encrypted content, refers to the disclosure information and judges, when a request is received from the playback device, whether disclosure of the encrypted content is permitted, and transmits the decryption key to the playback device if judged that disclosure is permitted, wherein the management device stores, as disclosure information, period information showing at least one of a disclosure start date and a disclosure end date, and judges whether disclosure of the content is permitted according to the period information;

the management device includes:

a key storage unit storing the decryption key;

a disclosure information storage unit storing the period information as disclosure information;

a disclosure judging unit operable to receive the request from the playback device, and to refer to the period information and judge whether disclosure of the encrypted content is permitted; and a key transmitting unit operable, if judged that disclosure is permitted, to transmit the decryption key to the playback device;

the portable recording medium stores the encrypted content encrypted using an encryption key, and a key request program for requesting the management device for the decryption key; and the playback device reads from the recording medium and executes the key request program, receives the decryption key from the management device, reads from the recording medium and decrypts the encrypted content using the decryption key, and plays the decrypted content, wherein playback device includes:

a key request program executing unit operable to read from the recording medium and execute the key request program;

a key receiving unit operable to receive the decryption key from the management device;

a content reading unit operable to read the encrypted content from the recording medium; and a playback unit operable to decrypt the encrypted content using the decryption key and playback the decrypted content.

2. The contents management system of claim 1 wherein the key request program authenticates a user.

3. The contents management system of claim 1 wherein the portable recording medium having the key request program and the encrypted content is a compact disk.

4. The contents management system of claim 1 wherein the portable recording medium having the key request program and the encrypted content is a DVD.

5. The contents management system of claim 2 wherein the management device determines if a key requested by the key request program should be sent to the content reading unit based on one or more predetermined criteria.

6. A contents management system in which a playback device plays an encrypted content stored on a portable recording medium, using a decryption key acquired from a management device, comprising:

the management device, holds the decryption key for decrypting the encrypted content in correspondence with disclosure information relating to disclosure of the encrypted content, refers to the disclosure information and judges, when a request is received from the playback device, whether disclosure of the encrypted content is permitted, and transmits the decryption key to the playback device if judged that disclosure is permitted, wherein the management device stores, as disclosure information, period information showing at least one of a disclosure start date and a disclosure end date, and judges whether disclosure of the content is permitted according to the period information;

the portable recording medium stores the encrypted content encrypted using an encryption key and a key request program for requesting the management device for the decryption key;

the playback device, reads from the recording medium and executes the key request program, receives the decryption key from the management device, reads from the recording medium and decrypts the encrypted content using the decryption key, and plays the decrypted content; and a manager device used by a manager of the system, wherein the manager device receives update information used for updating the period information and transmits the received update information to the management device, and the management device receives the update information from the manager device and updates the period information according to the received update information.

7. The contents management system of claim 6 wherein the key request program authenticates a user.

8. The contents management system of claim 6 wherein the recording medium having the key request program and the encrypted content is a compact disk.

9. The contents management system of claim 6 wherein the recording medium having the key request program and the encrypted content is a DVD.

10. The contents management system of claim 6 wherein the management device determines if a key requested by the key request program should be sent to the content reading unit using based on one or more predetermined criteria.

11. A contents management system in which a playback device plays an encrypted content stored on a portable recording medium, using a decryption key acquired from a management device, comprising:

the management device, holds the decryption key for decrypting the encrypted content in correspondence with disclosure information relating to disclosure of the encrypted content, refers to the disclosure information and judges, when a request is received from the playback device, whether disclosure of the encrypted content is permitted, and transmits the decryption key to the playback device if judged that disclosure is permitted, wherein the management device stores, as disclosure information, period information showing at least one of a disclosure start date and a disclosure end date, and judges whether disclosure of the content is permitted according to the period information;

the portable recording medium, stores the encrypted content encrypted using an encryption key, and a key request program for requesting the management device for the decryption key;

the playback device, reads from the recording medium and executes the key request program, receives the decryption key from the management device, reads from the recording medium and decrypts the encrypted content using the decryption key, and plays the decrypted content; and a manager device used by a manager of the system, wherein the management device, on receipt of a request from the playback device, generates historical information that includes a user identifier which uniquely identifies a user using the playback device, and a content identifier which uniquely identifies the encrypted content, and stores the generated historical information, the manager device receives an historical information request for transmission of historical information stored by the management device, and transmits the received historical information request to the management device, and the management device receives the historical information request from the manager device, reads the stored historical information and transmits the read historical information to the manager device.

12. The contents management system of claim 11 wherein the key request program authenticates a user.

13. The contents management system of claim 11 wherein the recording medium having the key request program and the encrypted content is a compact disk.

14. The contents management system of claim 12 wherein the recording medium having the key request program and the encrypted content is a DVD.

15. The contents management system of claim 12 wherein the management device determines if a key requested by the key request program should be sent to the content reading unit using based on one or more predetermined criteria.

* * * * *